US009220115B2

(12) United States Patent
Bhushan et al.

(10) Patent No.: US 9,220,115 B2
(45) Date of Patent: Dec. 22, 2015

(54) TECHNIQUES FOR CHANNEL ACCESS IN ASYNCHRONOUS UNLICENSED RADIO FREQUENCY SPECTRUM BAND DEPLOYMENTS

(71) Applicant: QUALCOMM Incorporated, San Diego, CA (US)

(72) Inventors: Naga Bhushan, San Diego, CA (US); Durga Prasad Malladi, San Diego, CA (US); Tao Luo, San Diego, CA (US); Aleksandar Damnjanovic, Del Mar, CA (US); Kiran Kumar Somasundaram, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/332,633

(22) Filed: Jul. 16, 2014

(65) Prior Publication Data
US 2015/0110012 A1 Apr. 23, 2015

Related U.S. Application Data

(60) Provisional application No. 61/894,792, filed on Oct. 23, 2013.

(51) Int. Cl.
*H04L 12/413* (2006.01)
*H04W 74/08* (2009.01)
(52) U.S. Cl.
CPC ................ *H04W 74/0816* (2013.01)
(58) Field of Classification Search
CPC .............................................. H04W 74/0816
See application file for complete search history.

(56) References Cited

U.S. PATENT DOCUMENTS

| 2010/0091716 | A1 | 4/2010 | Bonta et al. |
| 2012/0250532 | A1 | 10/2012 | Husted et al. |
| 2013/0203429 | A1* | 8/2013 | Kneckt ............ H04W 74/0816 455/450 |
| 2013/0223250 | A1* | 8/2013 | Matsuo ............ H04W 74/0808 370/252 |

(Continued)

FOREIGN PATENT DOCUMENTS

WO WO-2012049533 A1 4/2012

OTHER PUBLICATIONS

ISA/EPO, International Search Report and Written Opinion of the International Searching Authority, Int'l App. No. PCT/US2014/060867, Jan. 19, 2015, European Patent Office, Rijswijk, NL, 9 pgs.

*Primary Examiner* — Clemence Han
(74) *Attorney, Agent, or Firm* — Holland & Hart LLP

(57) ABSTRACT

Techniques are described for channel access in a radio frequency spectrum band shared by a number of asynchronous operators. One or more clear channel assessment (CCA) procedures may be used to contend for one or more transmission periods in the radio frequency spectrum band. When the contention is won for one or more transmission periods, a determination may be made as to whether the a number of transmission periods for which contention has been won is equal to or greater than a threshold number of consecutive transmission periods. If the number of transmission periods for which contention has been won is at or above the threshold number, occupancy of the radio frequency spectrum band may be relinquished for a period of time, in order to allow another operator to access the radio frequency spectrum band.

30 Claims, 21 Drawing Sheets

(56) References Cited

U.S. PATENT DOCUMENTS

| | | | | |
|---|---|---|---|---|
| 2014/0301351 A1* | 10/2014 | Gao | H04W 74/08 | 370/329 |
| 2015/0016561 A1* | 1/2015 | Negus | H04W 24/02 | 375/267 |
| 2015/0071060 A1* | 3/2015 | Bhushan | H04W 74/08 | 370/230 |
| 2015/0092758 A1* | 4/2015 | Chen | H04W 16/14 | 370/336 |
| 2015/0098397 A1* | 4/2015 | Damnjanovic | H04W 52/02 | 370/329 |
| 2015/0110066 A1* | 4/2015 | Gaal | H04L 5/0005 | 370/330 |
| 2015/0230105 A1* | 8/2015 | Negus | H04B 7/0408 | 370/329 |

\* cited by examiner

TECHNIQUES FOR CHANNEL ACCESS IN ASYNCHRONOUS UNLICENSED RADIO FREQUENCY SPECTRUM BAND DEPLOYMENTS

CROSS REFERENCES

The present application for patent claims priority to U.S. Provisional Patent Application No. 61/894,792 by Bhushan et al., entitled "Techniques For Channel Access In Asynchronous Unlicensed Radio Frequency Spectrum Band Deployments," filed Oct. 23, 2013, and assigned to the assignee hereof, which is hereby incorporated by reference in its entirety.

FIELD OF THE DISCLOSURE

The following relates, for example, to wireless communication, and more specifically to techniques for clear channel assessment in asynchronous unlicensed radio frequency spectrum band deployments.

BACKGROUND OF THE DISCLOSURE

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more heavily utilized, operators are seeking ways to increase capacity. One approach may include the use of WLANs to offload some of the traffic and/or signaling of a cellular network. WLANs (such as Wi-Fi networks) may offer attractive features because, unlike cellular networks that operate in a licensed spectrum, Wi-Fi networks may operate in an unlicensed radio frequency spectrum band, and are thus available for use by various entities subject to established rules for providing fair access to the spectrum. In some deployments, various operators may wish to access the unlicensed radio frequency spectrum band using one or more nodes that operate synchronously to access the unlicensed radio frequency spectrum band. However, if different deployments of synchronous nodes of different operators do not have time-aligned periods for channel contention, one or more operators may not be able to access unlicensed radio frequency spectrum band for a relatively long period of time. Thus, while nodes within an operator deployment may operate synchronously, the nodes of one operator may be asynchronous relative to nodes of other operator deployments. Thus, operators may need to employ techniques to ensure that nodes of the same or different operator deployments, using the same or different techniques for accessing the unlicensed radio frequency spectrum band, can fairly and effectively use the unlicensed radio frequency spectrum band, while also complying with established rules for spectrum access.

SUMMARY

The described features relate to one or more improved systems, methods, and/or devices for wireless communications, and more particularly, to contention-based channel access procedures that may enhance fairness and efficiency in communications using unlicensed radio frequency spectrum band. In examples, a device of an operator seeking to access a radio frequency spectrum band shared by a number of asynchronous operators may perform one or more clear channel assessment (CCA) procedures to contend for one or more transmission periods in which the device may transmit using the radio frequency spectrum band. When the contention is won for one or more transmission periods, a determination may be made as to whether the number of transmission periods for which contention has been won is equal to or greater than a threshold number of consecutive transmission periods. If the number of transmission periods for which contention has been won is equal to or greater than the threshold number of consecutive transmission period, occupancy of the radio frequency spectrum band may be relinquished for a period of time, in order to allow another operator to access the radio frequency spectrum band. Relinquishment of the radio frequency spectrum band may be accomplished by, for example, stopping contentions or transmissions/receptions on the radio frequency spectrum band for the time period.

According to a first set of illustrative examples, a method of wireless communication may include performing one or more clear channel assessment (CCA) procedures to contend for one or more transmission periods within a radio frequency spectrum band shared by a plurality of asynchronous operators; winning the contention for the one or more transmission periods within the radio frequency spectrum band; determining whether the one or more transmission periods for which contention has been won is equal to or greater than a threshold number of consecutive transmission periods; and relinquishing occupancy of the radio frequency spectrum band for a period of time, based on the determination that the one or more transmission periods for which contention has been won is equal to or greater than a threshold number of consecutive transmission periods. In certain examples, relinquishing occupancy of the radio frequency spectrum band may include stopping contentions or transmissions/receptions for the period of time.

In certain examples, the method may also include determining that a threshold number of asynchronous operators are contending for the first radio frequency spectrum band during the one or more transmission periods, and relinquishing occupancy of the first radio frequency spectrum band based at least in part on the determination that the threshold number of asynchronous operators are contending for the first radio frequency spectrum band. The threshold number of asynchronous operators may be for example, one asynchronous operator. In some examples, the method may also include discontinuing relinquishing occupancy of the first radio frequency spectrum band when it is determined that less than the threshold number of asynchronous operators are contending for the first radio frequency spectrum band during the one or more transmission periods.

In certain examples, determining that the threshold number of asynchronous operators are contending for the first radio frequency spectrum band may include monitoring for transmissions from one or more other asynchronous operators. Such monitoring may include, for example, discontinuing transmissions on the first radio frequency spectrum band for a time period, monitoring for one or more CCA exempt transmission (CET) signals from the one or more other asynchronous operators, and receiving a CET signal from the one or more other asynchronous operators. The threshold number of transmission periods may be adjusted, in some examples, prior to relinquishing occupancy of the first radio frequency spectrum band, based on the monitoring. In certain examples, the monitoring further may include receiving a CET signal from the one or more other asynchronous operators; and configuring a user equipment to monitor for the CET signals from the one or more other asynchronous operators and report identified information from the CET signals. In certain examples, information identifying one or more asynchronous operators may be received via one or more of a user equipment or an X2 communications link.

In certain examples, the threshold number of consecutive transmission periods may be determined based on one or more of a number of asynchronous operators performing CCA procedures to contend for the first radio frequency spectrum band during the one or more transmission periods, or an amount of data backlog at the one or more asynchronous operators. The threshold number of transmission periods may be, for example, one transmission period. In some examples, the first radio frequency spectrum band may be monitored during a transmission period corresponding to the period of time for transmissions from one or more other nodes. A determination may be made that one or more transmissions are received from one or more other nodes. The threshold number of consecutive transmission periods may be in the absence of transmissions from one or more other nodes, and the threshold number of consecutive transmission periods may be decreased when one or more transmissions from one or more other nodes are detected, according to certain examples. In other examples, a CCA procedure of the one or more CCA procedure may be performed in a first contention period among a set of coordinated nodes, and determining that contention has been won for the threshold number of consecutive transmission periods may include determining that contention has been won by one or more nodes of the set of coordinated nodes for the threshold number of consecutive transmission periods. In other examples, the method may further include occupying a second radio frequency spectrum band during the period of time of the relinquishment of occupancy of the first radio frequency spectrum band.

According to another set of illustrative examples, an apparatus for wireless communications may include means for performing one or more clear channel assessment (CCA) procedures to contend for one or more transmission periods within a first radio frequency spectrum band shared by a number of asynchronous operators; means for identifying that contention is won for the one or more transmission periods within the first radio frequency spectrum band; means for determining whether the one or more transmission periods for which contention has been won is equal to or greater than a threshold number of consecutive transmission periods; and means for relinquishing occupancy of the first radio frequency spectrum band for a period of time, based on the determination that the one or more transmission periods for which contention has been won is equal to or greater than a threshold number of consecutive transmission periods.

In certain examples, the apparatus may include means for implementing one or more aspects of first set of illustrative examples described above.

According to another set of illustrative examples, an apparatus for wireless communications may include at least one processor and a memory communicatively coupled with the at least one processor. The at least one processor may be configured to execute code stored on the memory to perform one or more clear channel assessment (CCA) procedures to contend for one or more transmission periods within a first radio frequency spectrum band shared by a number of asynchronous operators; identify that contention is won for the one or more transmission periods within the first radio frequency spectrum band; determine whether the one or more transmission periods for which contention has been won is equal to or greater than a threshold number of consecutive transmission periods; and relinquish occupancy of the first radio frequency spectrum band for a period of time, based on the determination that the one or more transmission periods for which contention has been won is equal to or greater than a threshold number of consecutive transmission periods.

In certain examples, the at least one processor may be configured to execute code stored on the memory to implement one or more aspects of first set of illustrative examples described above.

According to another set of illustrative examples, a computer program product may include a non-transitory computer-readable medium having computer-readable code. The computer readable code may be configured to cause at least one processor to cause a wireless communications apparatus to: perform one or more clear channel assessment (CCA) procedures to contend for one or more transmission periods within a first radio frequency spectrum band shared by a number of asynchronous operators; identify that contention is won for the one or more transmission periods within the first radio frequency spectrum band; determine whether the one or more transmission periods for which contention has been won is equal to or greater than a threshold number of consecutive transmission periods; and relinquish occupancy of the first radio frequency spectrum band for a period of time, based on the determination that the one or more transmission periods for which contention has been won is equal to or greater than a threshold number of consecutive transmission periods.

In certain examples, the computer-readable code may be configured to cause the at least one processor to implement one or more aspects of first set of illustrative examples described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
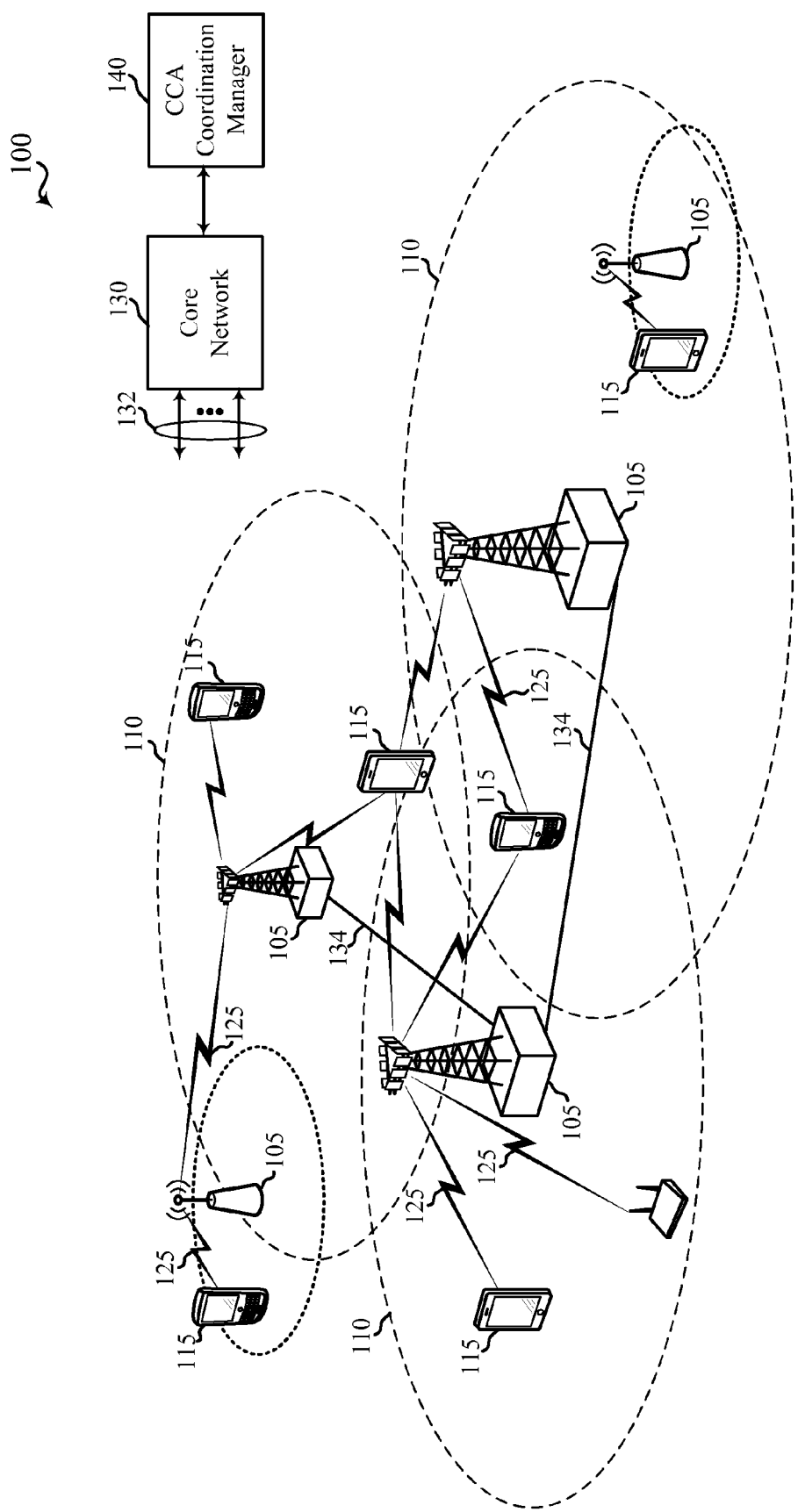
FIG. 1 shows a block diagram conceptually illustrating an example of a telecommunications system, in accordance with aspects of the present disclosure.

With increasing data traffic in cellular networks, offloading at least some data traffic to unlicensed radio frequency spectrum band may provide cellular operators with opportunities for enhanced data transmission capacity. Prior to gaining channel access and transmitting using an unlicensed radio frequency spectrum band, a transmitting device may, in some deployments perform listen before talk (LBT) procedure to gain channel access. Such a LBT procedure may include a clear channel assessment (CCA) to determine if a particular channel is available. If it is determined that a channel is not available, CCA may be performed again at a later time. Furthermore, use of unlicensed radio frequency spectrum band may need coordination to ensure that nodes of the same or different operator deployments, using the same or different techniques for accessing the unlicensed radio frequency spectrum band, may co-exist within the unlicensed radio frequency spectrum band.

In some cases, the co-existence may be facilitated by the coordination of CCAs performed by different devices or nodes of different operator deployments that want to access the unlicensed radio frequency spectrum band. In some of the CCA coordination methods, CCAs may be coordinated to occur in predetermined time periods amongst multiple devices or nodes that may desire to access the unlicensed radio frequency spectrum band. For example, a time period may be identified during which multiple coordinated nodes may perform CCA for downlink channel access in an unlicensed radio frequency spectrum band. Such coordination results in a synchronous system in which nodes or devices seek access, and transmit radio frequency signals, in a synchronized manner.

While such time-synchronization may be ensured within a single operator deployment, it may or may not be ensured between different operators deploying unlicensed radio frequency spectrum band service on the same channel or radio frequency spectrum band, and there may be cases where different access points (e.g., eNBs configured to transmit/receive using an unlicensed radio frequency spectrum band) have asynchronous timing. In such cases, the LBT protocol described above can lead to significant inefficiencies in an asynchronous deployment. More specifically, if a first set of coordinated access points performs a CCA procedure earlier in a frame than other sets of coordinated access points, this first set of coordinated access points may be transmitting during a relatively large number of consecutive radio frames resulting in multiple consecutive unsuccessful radio frequency spectrum band contentions by the other sets of coordinated access points. According to various examples described herein, CCA techniques are provided that may resolve these issues and provide more fairness among different nodes and operators for asynchronous timing deployment.

According to various aspects of the present disclosure, a device of an operator seeking to access a radio frequency spectrum band shared by a number of asynchronous operators may perform one or more CCA procedures to contend for one or more transmission periods in which the device may occupy the radio frequency spectrum band. When the contention is won for one or more transmission periods, a determination may be made as to whether the number of transmission periods for which contention has been won is equal to or greater than a threshold number of consecutive transmission periods. If the number of transmission periods for which contention has been won is equal to or greater than the threshold number of consecutive transmission periods, occupancy of the radio frequency spectrum band may be relinquished for a period of time, in order to allow another operator to access the radio frequency spectrum band. Relinquishment of the radio frequency spectrum band may be accomplished by, for example, stopping contention procedures and/or transmissions/receptions on the radio frequency spectrum band for the time period.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1x/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards that may transmit using unlicensed radio frequency spectrum band in the 5 GHz band according to established rules for access to the unlicensed radio frequency spectrum band.

Referring first to FIG. 1, a diagram illustrates an example of a wireless communications system 100, in accordance with aspects of the present disclosure. The wireless communications system 100 includes a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In examples, the wireless communications system 100 is an LTE/LTE-A communications system (or network) that supports one or more modes of operation or deployment scenarios, and may employ coordinated contention-based channel access procedures among access points 105 and UEs 115, and may employ DTX periods for determination of continued channel availability in the presence of one or more asynchronous access points. Such coordination may be managed by CCA coordination manager 140, according to some examples. In examples, the wireless communications system 100 may support wireless communications using an unlicensed radio frequency spectrum band, or a licensed spectrum and an access technology different from LTE/LTE-A. In LTE/LTE-A network communication systems, the terms evolved Node B (eNodeB) may be used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A pico cell may cover a relatively smaller geographic area and may allow unrestricted access by UEs 115 with service subscriptions with the network provider. A femto cell also may cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNodeBs or other access points 105 via a backhaul links 132 (e.g., 51 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, pico eNodeBs, femto eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The downlink transmissions may be made using a licensed spectrum (e.g., LTE), an unlicensed radio frequency spectrum band, or both. Similarly, the uplink transmissions may be made using a licensed spectrum (e.g., LTE), an unlicensed radio frequency spectrum band, or both.

In some examples of the wireless communications system 100, various deployment scenarios may be supported including a supplemental downlink mode in which LTE downlink capacity in a licensed spectrum may be offloaded to an unlicensed radio frequency spectrum band, a carrier aggregation mode in which both LTE downlink and uplink capacity may be offloaded from a licensed spectrum to an unlicensed radio frequency spectrum band, and a stand-alone mode in which LTE downlink and uplink communications between a base station (e.g., eNB) and a UE may take place in an unlicensed radio frequency spectrum band. Each of the different modes may operate according to frequency division duplexing (FDD) or time division duplexing (TDD). OFDMA communications signals may be used in the communication links 125 for LTE downlink transmissions in an unlicensed and/or a licensed spectrum, while SC-FDMA communications signals may be used in the communication links 125 for LTE uplink transmissions in an unlicensed and/or a licensed spectrum. Transmissions using the unlicensed radio frequency spectrum band may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using unlicensed radio frequency spectrum band may be required to verify that the unlicensed radio frequency spectrum band is available for use in such a transmission, that is, the unlicensed radio frequency spectrum band is not already in use by one or more other devices. Thus, prior to transmitting using the unlicensed radio frequency spectrum band, a device may perform a contention-based channel access procedure, also referred to as a listen before talk (LBT) procedure, in order to gain channel access. For example, a CCA may be used to determine availability of the unlicensed radio frequency spectrum band. Performance of a CCA may involve checking that the desired spectrum is not otherwise occupied prior to initiating transmissions. In some examples, CCA opportunities are coordinated across multiple access points 105 of an operator, and may occur at periodic intervals, such as every 10 ms. A transmitting entity, such as an access point 105, may desire channel access and perform CCA to determine if a particular carrier frequency in the unlicensed radio frequency spectrum band is occupied. If the particular carrier frequency in the unlicensed radio frequency spectrum band is occupied, the access point 105 waits until the next CCA opportunity before attempting to obtain channel access again on the associated carrier frequency. In deployments that provide CCA opportunities once every 10 ms, for example, the access point 105 would then have to wait 10 ms before re-attempting channel access. Similarly, a UE 115 may desire to transmit uplink data using unlicensed radio frequency spectrum band to an access point 105, and perform CCA in a similar manner.

In some examples, as mentioned above, multiple operators may provide coordinated access points 105 that may perform CCA procedures at predefined times in a contention-based procedure for access to a radio frequency spectrum band. An access point 105 that does not win a radio frequency spectrum band channel during the first CCA procedure then waits the defined time period for the next coordinated CCA opportunity. An access point 105 that does win the radio frequency spectrum band channel may then transmit radio signals using the radio frequency spectrum band. As noted above, in situations where one or more access points 105 operate asynchronously and also perform CCA procedures at predefined times, such access points 105 may be precluded from channel access for a relatively long period of time. According to some examples, an access point 105 that wins the radio frequency spectrum band in a CCA procedure may relinquish occupancy of the radio frequency spectrum band when contention for the radio frequency spectrum band has been won some for a threshold number of consecutive frames. This may allow one or more asynchronous access points 105 to gain access to the radio frequency spectrum band. Additional details regarding the implementation deployment scenarios or modes of operation in a system such as the wireless communications system 100, as well as other features and functions related to the operation of the wireless communications system 100, are provided below with reference to FIGS. 2-19.

Figure 2:
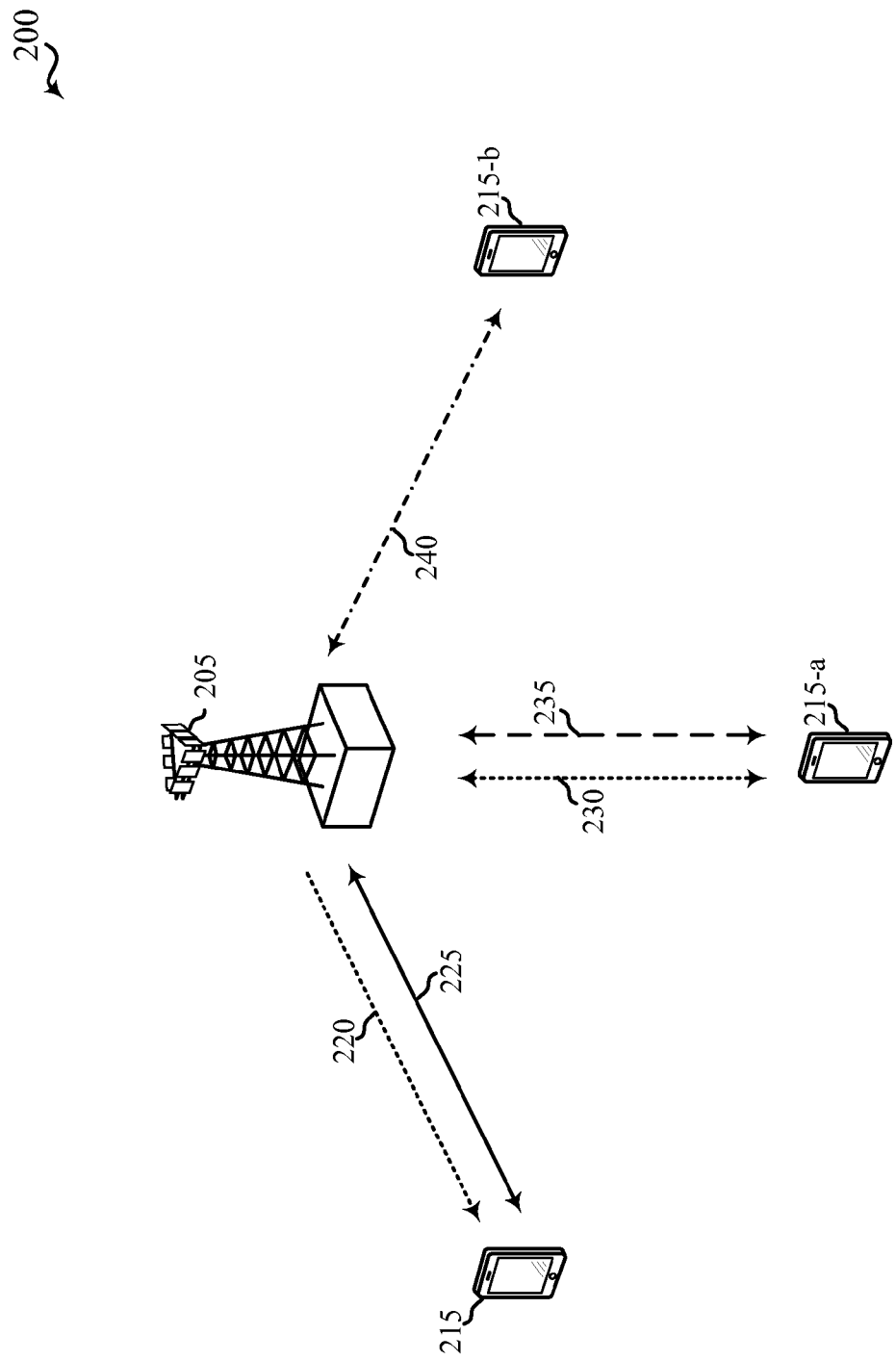
FIG. 2 is a block diagram conceptually illustrating examples of deployment scenarios for using LTE in an unlicensed radio frequency spectrum band, in accordance with aspects of the present disclosure.

FIG. 2 is a block diagram conceptually illustrating examples of deployment scenarios for using LTE in an unlicensed radio frequency spectrum band, in accordance with aspects of the present disclosure. A wireless communications system 200 illustrates examples of a supplemental downlink mode, a carrier aggregation mode, and a stand-alone mode, for between an eNB 205 and UEs 215 in an LTE network that supports communications over an unlicensed radio frequency spectrum band. The wireless communications system 200 may be an example of portions of the wireless communications system 100 described with reference to FIG. 1. Moreover, the eNB 205 may be an example of one of the access points 105 of FIG. 1, while the UEs 215 may be examples of the UEs 115 described with reference to FIG. 1.

In the example of a supplemental downlink (SDL) mode in wireless communications system 200, the eNB 205 may transmit OFDMA communications signals to a UE 215 using downlink 220. In the example of FIG. 2, downlink 220 may be associated with a frequency in an unlicensed radio frequency spectrum band. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed spectrum. The downlink 220 in the unlicensed radio frequency spectrum band and the bidirectional link 225 in the licensed spectrum may operate concurrently. The downlink 220 may provide a downlink capacity offload for the eNB 205. In some examples, the downlink 220 may be used for unicast services (e.g., addressed to one UE) or for multicast services (e.g., addressed to several UEs). This scenario may occur with any service provider (e.g., a traditional mobile network operator or MNO) that uses a licensed spectrum and needs to relieve some of the traffic and/or signaling congestion.

In one example of a carrier aggregation (CA) mode in wireless communications system 200, the eNB 205 may transmit OFDMA communications signals to a UE 215-a using a bidirectional link 230 and may receive SC-FDMA communications signals from the same UE 215-a using the bidirectional link 230. In the example of FIG. 2, bidirectional link 230 that may be associated with a frequency in an unlicensed radio frequency spectrum band. The eNB 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency in a licensed spectrum. The bidirectional link 230 may provide a downlink and uplink capacity offload for the eNB 205. Like the supplemental downlink described above, this scenario may occur with any service provider (e.g., a mobile network operator (MNO)) that uses a licensed spectrum needs to relieve some of the traffic and/or signaling congestion. Bidirectional link 230 may operate using TDD communications, according to some examples. As both the eNB 205 and UE 215-a transmit data using bidirectional link 230, each would perform an LBT procedure prior transmitting data using the bidirectional link 230 on the unlicensed radio frequency spectrum band, and each may determine the presence of one or more asynchronous devices and relinquish occupancy of the radio frequency spectrum band (e.g., by stopping contention procedures and/or transmissions) for a period of time when contention has been won for a threshold number of consecutive radio frames.

In an example of a stand-alone (SA) mode in wireless communications system 200, the eNB 205 may transmit OFDMA communications signals to a UE 215-b using a bidirectional link 240 and may receive SC-FDMA communications signals from the same UE 215-b using the bidirectional link 240 which may be associated with a frequency in an unlicensed radio frequency spectrum band. Bidirectional link 240 may operate using TDD communications, according to some examples. The bidirectional link 240 may provide a downlink and uplink capacity offload for the eNB 205.

As described above, a service provider that may benefit from the capacity offload offered by using LTE deployed in an unlicensed radio frequency spectrum band may be a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed radio frequency spectrum band.

In the SDL mode, control for communications using the unlicensed radio frequency spectrum band may be transported over the LTE uplink (e.g., uplink portion of the bidirectional link 225) in the licensed spectrum. One of the reasons to provide downlink capacity offload is because data demand may be largely driven by downlink consumption. Moreover, in this mode, there may be reduced regulatory impact since the UE 215 is not transmitting in the unlicensed radio frequency spectrum band.

In the CA mode, data and control may be communicated in LTE (e.g., bidirectional link 235) using licensed spectrum while data may be communicated using bidirectional link 230 using unlicensed radio frequency spectrum band. The carrier aggregation mechanisms supported when using unlicensed radio frequency spectrum band may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed radio frequency spectrum band. According to various examples, as mentioned above, communications may be transmitted according to TDD techniques. As is understood, a number of subframes in TDD communications may include downlink data, and a number of subframes may include uplink data.

Figure 3:
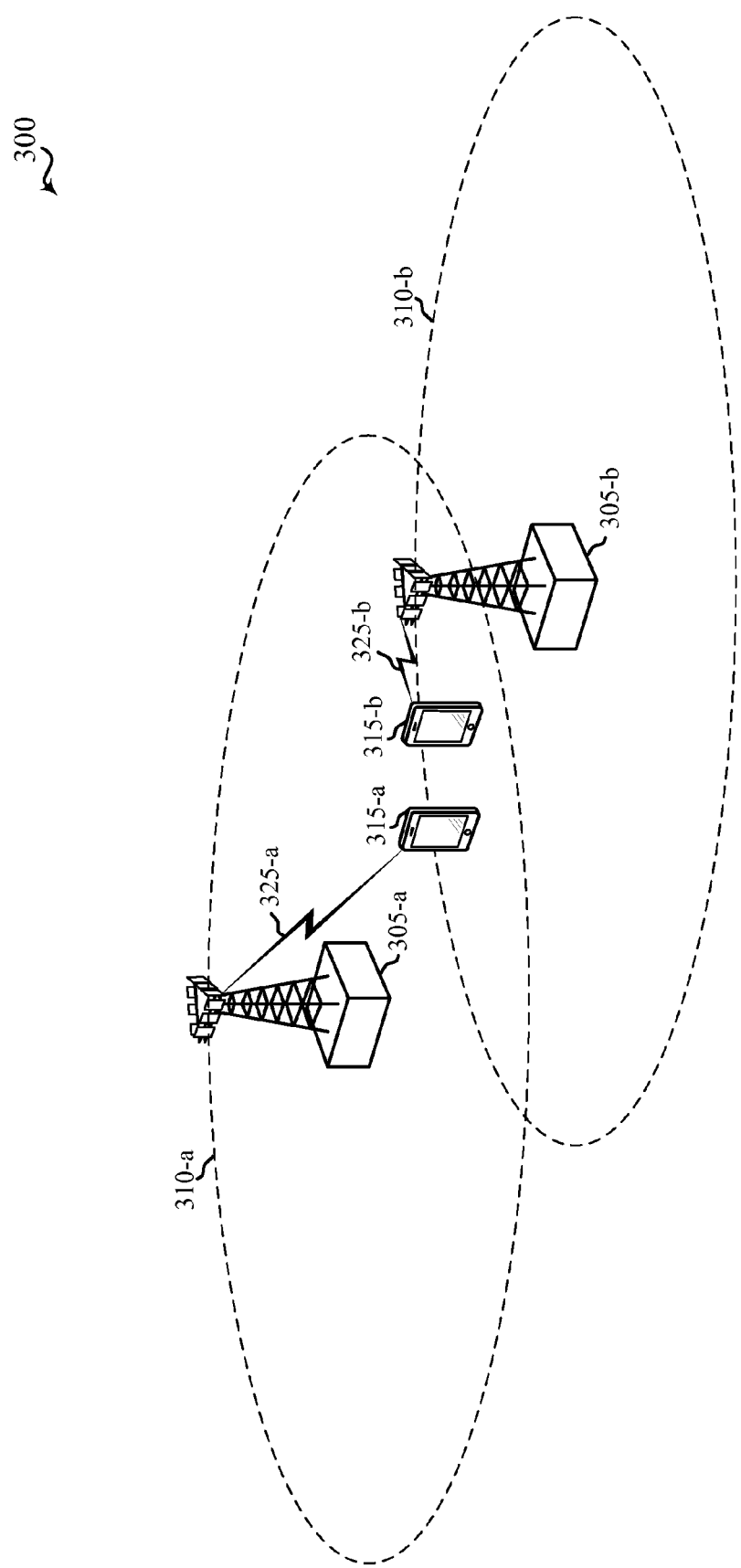
FIG. 3 is a block diagram conceptually illustrating an example of neighboring base stations and associated UEs, in accordance with aspects of the present disclosure.

FIG. 3 is a block diagram conceptually illustrating an example of neighboring base stations, associated UEs, and other spectrum users, in accordance with aspects of the present disclosure. In this example, a portion of a wireless communications system 300 is illustrated in which multiple eNBs 305-*a* and 305-*b* may have overlapping coverage areas 310-*a* and 310-*b*, respectively. In this example, eNB 305-*a* may communicate with UE 315-*a* using communications link 325-*a* in an unlicensed radio frequency spectrum band. Similarly, eNB 305-*b* may communicate with UE 315-*b* using communications link 325-*b* in an unlicensed radio frequency spectrum band. According to some deployments, eNB 305-*a* and UE 315-*a* may be deployed in a first operator's network and may be coordinated and contend for the unlicensed radio frequency spectrum band independently on each synchronous frame during a contention period that is coordinated among the eNBs 305 of the first operator. Further, in some deployments, eNB 305-*b* and UE 315-*b* may be deployed in a second operator's network and may be coordinated and contend for the unlicensed radio frequency spectrum band independently on each synchronous frame during a contention period that is coordinated among the eNBs 305 of the second operator. As mentioned above, in examples where the first operator eNB 305-*a* and UE 315-*a* and second operator eNB 305-*b* and UE 315-*b* are not synchronized, one of the operators may be precluded from accessing the radio frequency spectrum band for a relatively long period of time if the coordinated contention periods are asynchronous. As is well understood, other users may also transmit signal in the radio frequency spectrum band, including, for example, a Wi-Fi access point. A Wi-Fi access point may transmit Wi-Fi signals in the radio frequency spectrum band.

As mentioned above, a Wi-Fi access point may communicate asynchronously with one or more other devices and may not have priority over any other devices seeking access to the radio frequency spectrum band. Accordingly, a Wi-Fi access point may gain channel access to the radio frequency spectrum band through standard LBT procedures used to access unlicensed radio frequency spectrum band. In the event that Wi-Fi access point is transmitting during a CCA procedure of one or both of eNBs 305, the Wi-Fi access point would win the radio frequency spectrum band channel, and eNBs 305 would not transmit using the radio frequency spectrum band channel until a successful CCA procedure.

Figure 4A:
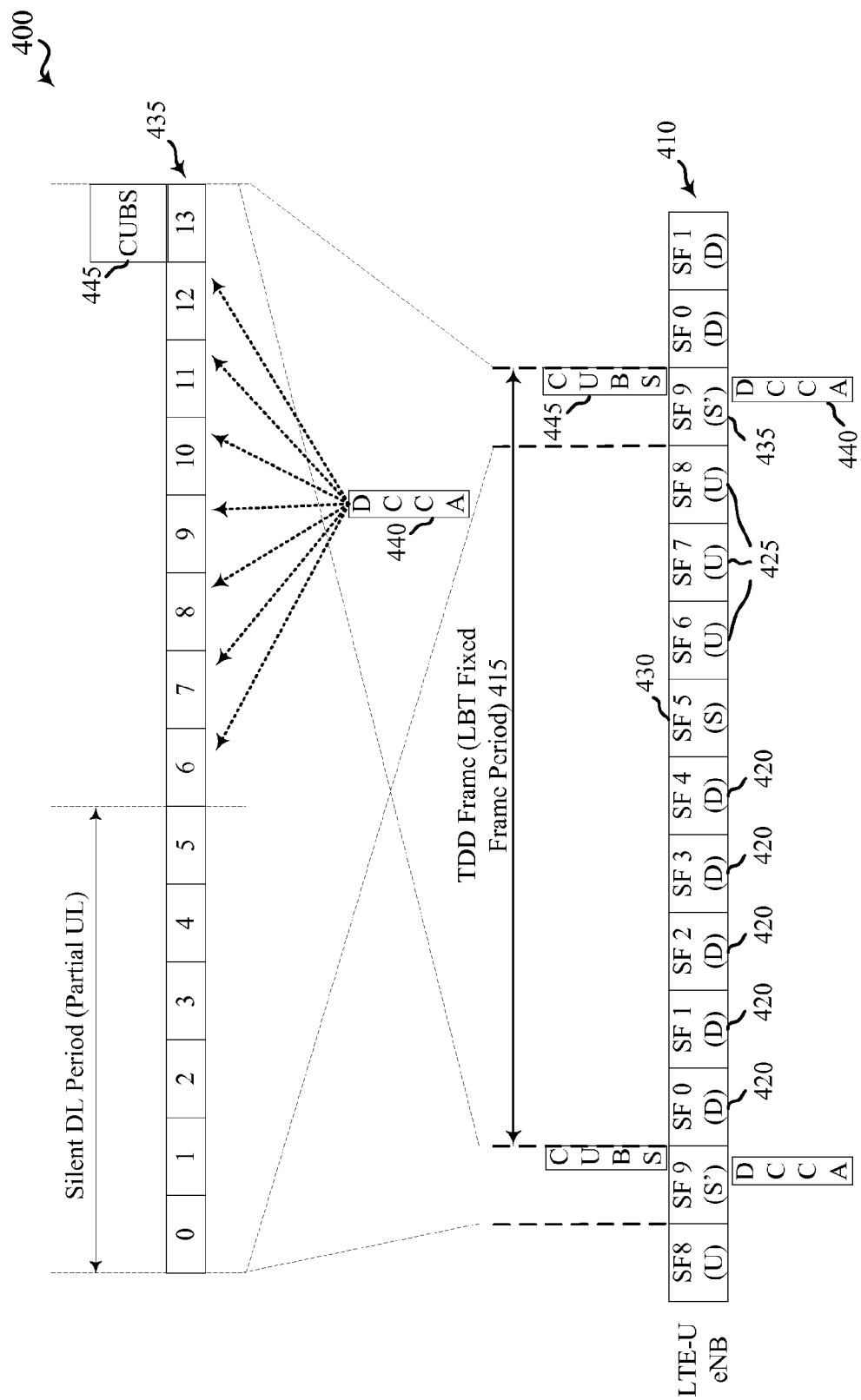
FIG. 4A is a block diagram conceptually illustrating an example of a radio frame and associated subframes, and downlink CCA intervals for coordinated contention-based radio frequency spectrum band access in a carrier aggregation mode or stand-alone mode, in accordance with aspects of the present disclosure.

FIG. 4A is a block diagram 400 conceptually illustrating an example of a radio frame and associated subframes, and downlink CCA intervals for coordinated contention-based radio frequency spectrum band access in a carrier aggregation mode or stand-alone mode, in accordance with aspects of the present disclosure. In this example, a TDD communication 410 is illustrated, which may be employed in a stand-alone mode or a carrier aggregation mode, such as described above. A TDD frame 415, which may correspond to a LBT fixed frame period, may be 10 ms and include a number of downlink subframes 420, a number of uplink subframes 425, and two types of special subframes, an S subframe 430 and an S' subframe 435. The S subframe 430 serves as a transition between downlink subframes 420 and uplink subframes 425, while the S' subframe 435 serves as a transition between uplink subframes 425 and downlink subframes 420 and a transition between TDD frames 415. During the S' subframe, downlink CCA (D-CCA) may be performed by an eNB, such as access points 105, 205, and/or 305 described above with respect to FIGS. 1-3. Following a successful CCA, an eNB may transmit a channel usage beacon signal (CUBS) 445 to provide an indication that the eNB has won the channel.

The S' subframe 435 may include 14 OFDM symbols, numbered 0 through 13 in FIG. 4A. A first portion of the S' subframe, symbols 0 through 5 in this example, may be used by eNBs as an off time, which may be required for use of the unlicensed radio frequency spectrum band. Thus, an eNB will not transmit data during this period, although a UE may transmit some amount of data during such a period, and thus some uplink data may be transmitted in this period, according to various examples. A second portion of the S' subframe 435 may be used for D-CCA 440. In the example of FIG. 4A, the S' subframe 435 includes seven D-CCA intervals, included in symbols 6 through 12 in the example of FIG. 4A. As noted above, CCAs in a system may be coordinated in order to provide more efficient system operation. In some examples, in order to determine which of the seven possible intervals is used to perform D-CCA, the eNB may evaluate a mapping-function of the form $$F_D(\text{GroupID},t) \in \{1,2,3,4,5,6,7\}$$

where GroupID is a "deployment group-id" assigned to the eNB, and t is the LBT frame number, corresponding to TDD frame (LBT fixed frame period) 415 in the example of FIG. 4A.

Figure 4B:
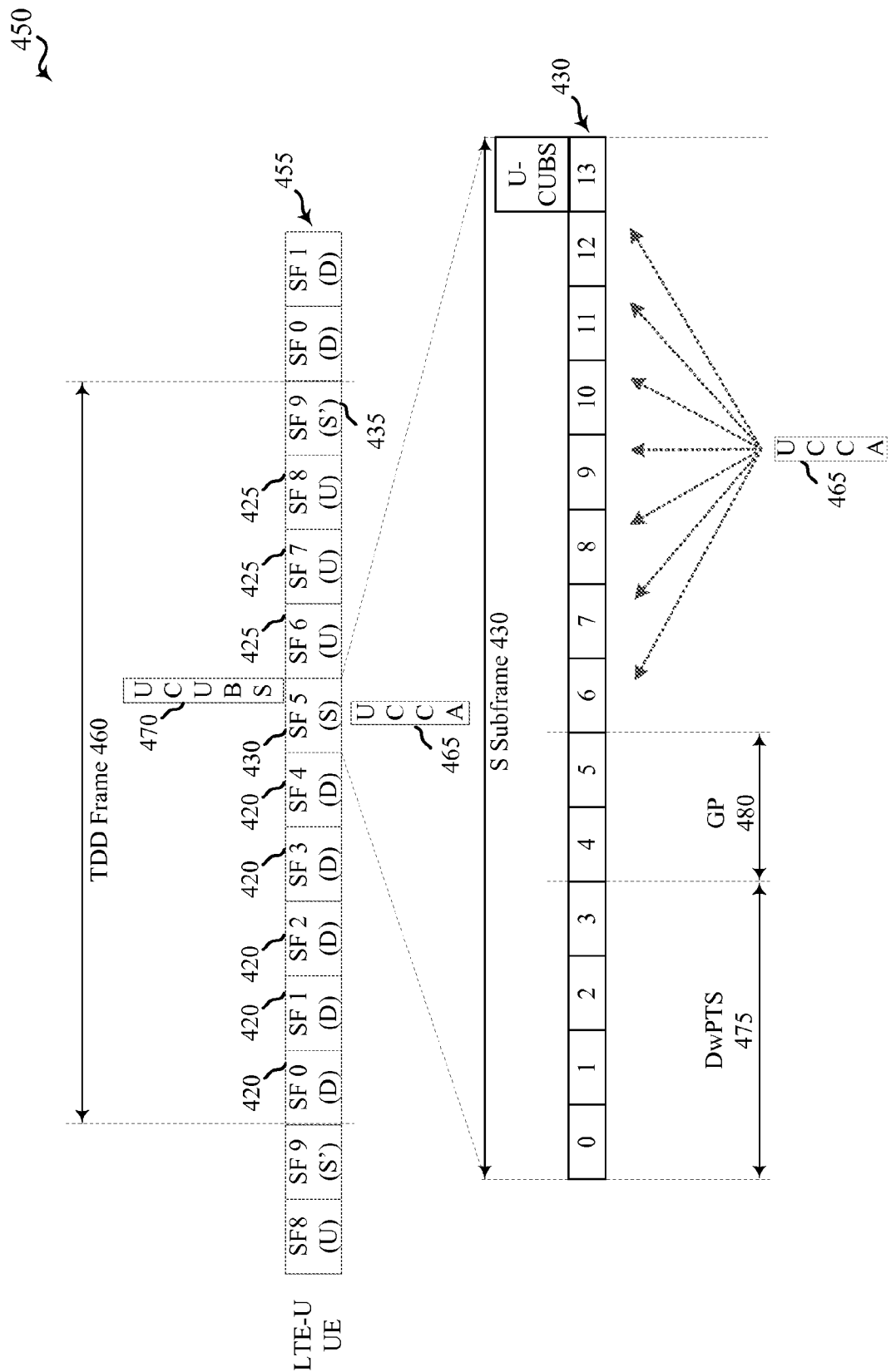
FIG. 4B is a block diagram conceptually illustrating an example of a radio frame and associated subframes, and uplink CCA intervals for coordinated contention-based radio frequency spectrum band access in a carrier aggregation mode or stand-alone mode, in accordance with aspects of the present disclosure.

FIG. 4B is a block diagram 450 conceptually illustrating an example of a radio frame and associated subframes, and uplink CCA intervals for coordinated contention-based radio frequency spectrum band access in a carrier aggregation mode or stand-alone mode, in accordance with aspects of the present disclosure. As with the example of FIG. 4*a*, a TDD communication 455 is illustrated. A TDD frame 460, corresponding to TDD frame 415 of FIG. 4A, and may correspond to a LBT fixed frame period, and includes a number of downlink subframes 420, a number of uplink subframes 425, and two types of special subframes, an S subframe 430 and an S' subframe 435. As discussed above, the S subframe 430 serves as a transition between downlink subframes 420 and uplink subframes 425, while the S' subframe 435 serves as a transition between uplink subframes 425 and downlink subframes 420 and a transition between TDD frames 415. During the S subframe 430, uplink CCA (U-CCA) 465 may be performed by a UE, such as UEs 115, 215, and/or 315 described above with respect to FIGS. 1-3. Following a successful U-CCA 465, a UE may transmit a channel usage beacon signal (CUBS) 470 to provide an indication that the UE has won the channel.

The S subframe 430 may include 14 OFDM symbols, numbered 0 through 13 in FIG. 4B. A first portion of the S subframe 430, symbols 0 through 3 in this example, may be a downlink pilot time slot (DwPTS) 475, and a second portion of the S subframe 430 may be a guard period (GP) 480. A third portion of the S subframe 430 may be used for U-CCA 465. In the example of FIG. 4B, the S subframe 430 includes seven U-CCA intervals, included in symbols 6 through 12 in the example of FIG. 4B. As noted above, CCAs in a system may be coordinated in order to provide more efficient system operation. In some examples, in order to determine which of the seven possible intervals is used to perform U-CCA, the UE may evaluate a mapping-function, similarly as with the D-CCA mapping function, of the form:

$$F_U(\text{GroupID},t) \in \{1,2,3,4,5,6,7\}$$

where GroupID is a "deployment group-id" assigned to the UE, and t is the LBT frame number, corresponding to TDD frame (LBT fixed frame period) 415 in the example of FIG. 4B.

The CCA-mapping functions may be constructed based on different criteria, depending on whether the mapping function will have an orthogonalization or a non-orthogonalization property. In the absence of any detection of transmissions on the radio frequency spectrum band, the node with the group-id which maps to an earlier CCA interval will secure the channel, which it may then use over the next LBT frame. According to various deployments, the mapping-function is fair, in the sense that across different time indices t, the mapping $\{F_{D/U}(x, t), t=1, 2, 3, \ldots\}$ varies such that different deployment group-ids have an equal chance of mapping to an earlier CCA interval (and hence secure the channel in the absence of other interference) over a suitably long interval of time.

All nodes deployed by the same operator/service-provider may be assigned the same group-id, so that they do not pre-empt each other in the contention process. This allows full frequency reuse among nodes of the same deployment, leading to enhanced system throughput. Nodes of different deployments may be assigned different deployment group-ids, so that with orthogonal CCA-mapping, access to the channel is mutually exclusive.

Figure 5:
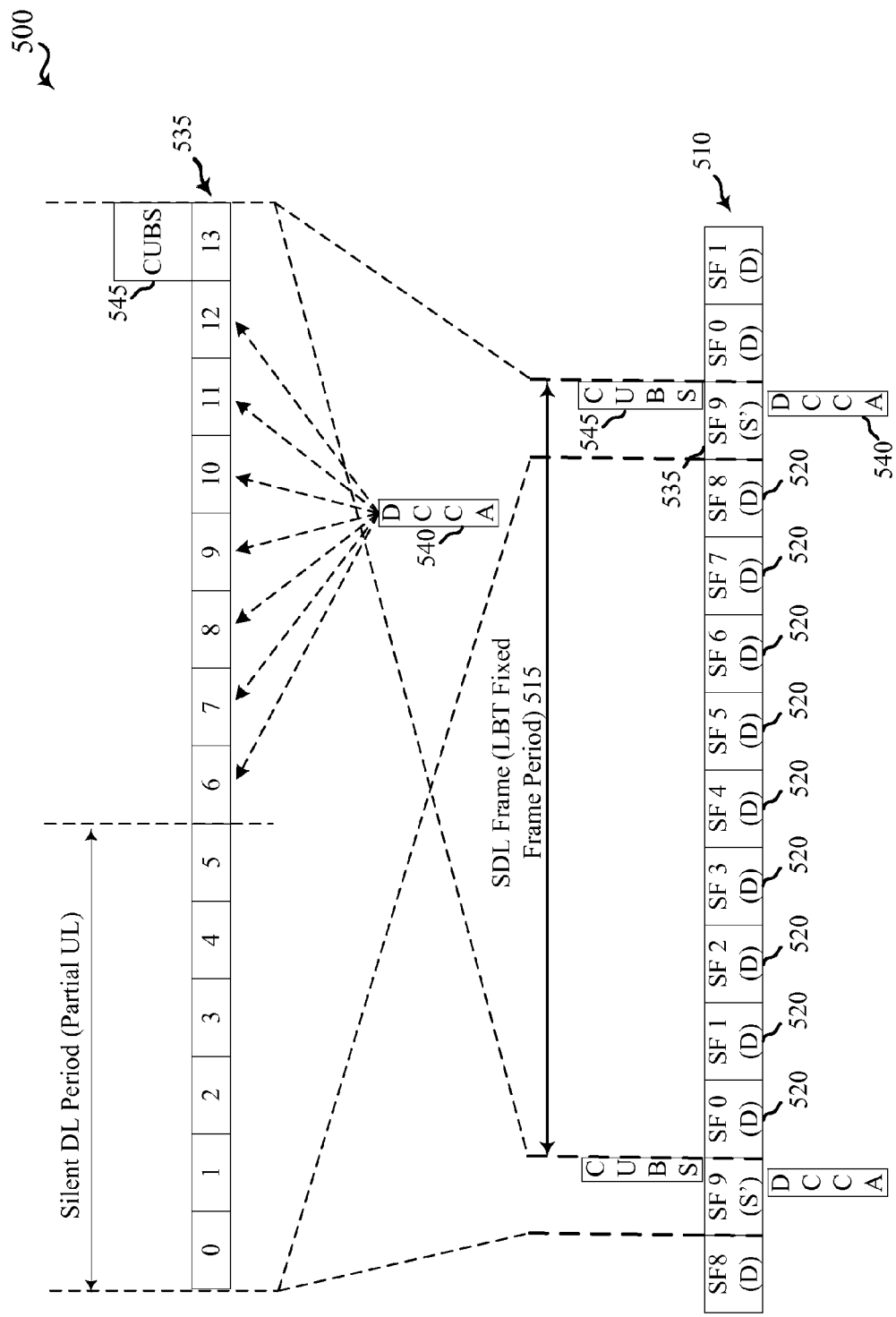
FIG. 5 is a block diagram conceptually illustrating an example of a radio frame and associated subframes, and downlink CCA intervals for contention-based radio frequency spectrum band access in a supplemental downlink mode, in accordance with aspects of the present disclosure.

FIG. 5 illustrates an example 500 of contention-based channel access and modifications that may be made to contention-based procedures, in accordance with aspects of the present disclosure. In example 500, a supplemental downlink communication 510 is illustrated. A supplemental downlink (SDL) frame 515, which may correspond to a LBT fixed frame period, may be 10 ms and include a number of downlink subframes 520, and an S' subframe 535. The S' subframe 535 may include a contention period during which eNBs may contend for channel access to the radio frequency spectrum band. During the S' subframe 535, downlink CCA (D-CCA) 540 may be performed by an eNB, such as access points 105, 205, and/or 305 described above with respect to FIGS. 1-3. Following a successful D-CCA 540, an eNB may transmit a channel usage beacon signal (CUBS) 545 to provide an indication that the eNB has won the channel.

Similarly as described above, the S' subframe 535 may include 14 OFDM symbols, numbered 0 through 13 in FIG. 5, with a first portion of the S' subframe 535 used by eNBs as an off time. A second portion of the S' subframe 535 may be used for D-CCA 540. In the example of FIG. 5, the S' subframe 535 includes seven D-CCA intervals, included in symbols 6 through 12 in the example of FIG. 5. As noted above, CCAs in a system may be coordinated in order to provide more efficient system operation, and a mapping function may determine a CCA interval for an eNB.

As described above with respect to the supplemental downlink mode, the stand-alone mode, and the carrier aggregation mode, an eNB (or a UE in stand-alone or carrier aggregation modes) when a node wins contention and begins broadcasting CUBS, other nodes are precluded from accessing the channel of the radio frequency spectrum band for the remainder of the duration of the radio frame until the next S or S' subframe. As discussed above, in the event that CCAs are synchronized, the mapping functions provide for fair access to the radio frequency spectrum band channel. However, in situations where one or more asynchronous operators are contending for the radio frequency spectrum band, an operator that has contention periods following a contention period of another operator in a frame may be precluded from accessing the channel for an extended period.

Figure 6:
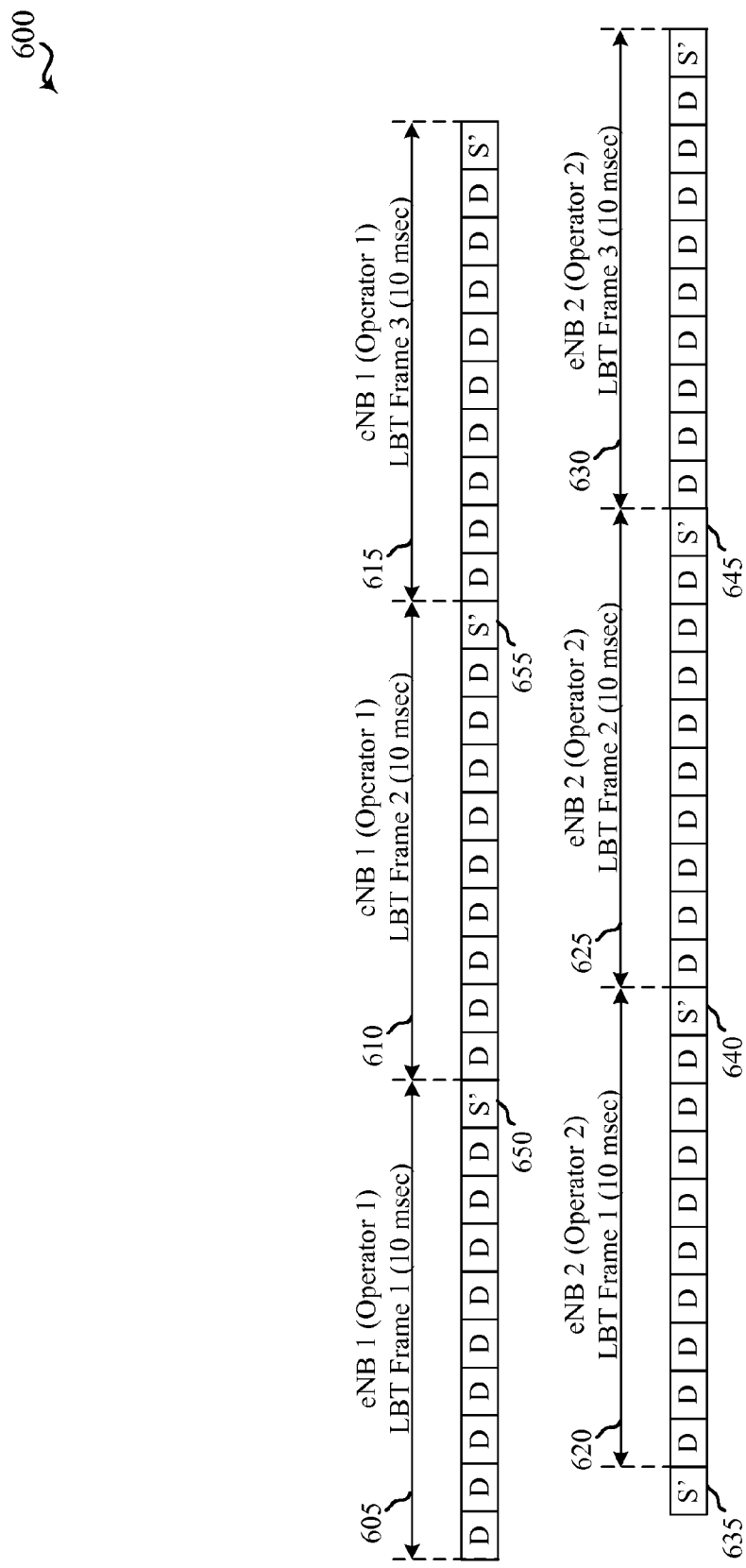
FIG. 6 is a block diagram conceptually illustrating asynchronous radio frames of different eNBs in a contention-based radio frequency spectrum band deployment, in accordance with aspects of the present disclosure.

FIG. 6 is a block diagram 600 conceptually illustrating asynchronous radio frames of different eNBs in a contention-based radio frequency spectrum band deployment, in accordance with aspects of the present disclosure. In this example, a first eNB (eNB 1) transmits consecutive LBT frames 605, 610, and 615. In this example, the LBT frames 605-615 are supplemental downlink frames, although similar situations may arise with respect to stand-alone mode and/or carrier aggregation mode frames. In the example of FIG. 6, a second eNB (eNB 2) transmits consecutive LBT frames 620, 625, and 630. In this example, the LBT frames 620-630 also are supplemental downlink frames, although similar situations may arise with respect to stand-alone mode and/or carrier aggregation mode frames. If the second eNB is not synchronized with the first eNB, such as illustrated in FIG. 6, the special subframes 635, 640, and 645 of the second eNB may occur during the LBT frames 605-615 of the first eNB. Because the first eNB is already transmitting when the second eNB initiates the CCA in special subframe 635, the second eNB will be precluded from channel access. As illustrated in FIG. 6, special subframes 640 and 645 of the second eNB are also occurring during the transmission period of the first eNB and thus the second eNB will be precluded from channel access for LBT frames 625 and 630. The second eNB may be precluded from accessing the channel until the first eNB finishes transmitting all its data or voluntarily relinquishes the channel and thus may lead to unfair access of the channel and degraded user experience for the second eNB.

The first eNB may, in some examples, be associated with a deployment of a first operator, and may be a part of a set of coordinated nodes of the first operator. The second eNB may, in some examples, be associated with a deployment of a second operator, and may be a part of a second set of coordinated nodes of the second operator. In some cases, the first and second operators may synchronize their LBT frames and contention periods within the LBT frames. In other cases, such as illustrated in FIG. 6, the first and second operators may have unsynchronized LBT frames.

Figure 7:
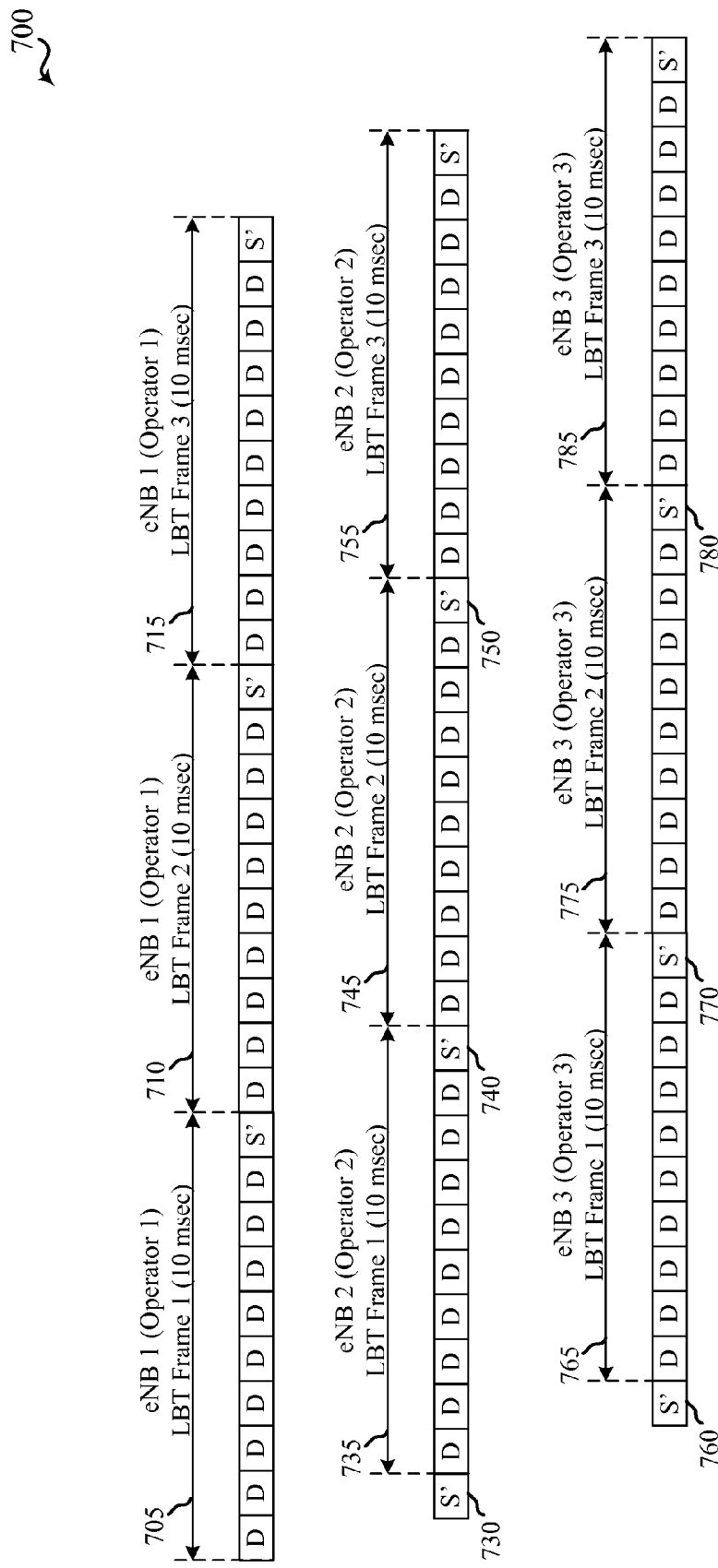
FIG. 7 is a block diagram conceptually illustrating asynchronous radio frames of three different eNBs in a contention-based radio frequency spectrum band deployment, in accordance with aspects of the present disclosure.

FIG. 7 is a block diagram 700 conceptually illustrating asynchronous radio frames of three different eNBs in a contention-based radio frequency spectrum band deployment, in accordance with aspects of the present disclosure. In this example, a first eNB (eNB 1) transmits consecutive LBT frames 705, 710, and 715. In this example, the LBT frames 705-715 are supplemental downlink frames, although similar situations may arise with respect to stand-alone mode and/or carrier aggregation mode frames. In the example of FIG. 7, a second eNB (eNB 2) transmits consecutive LBT frames 735, 745, and 755, and a third eNB (eNB 3) transmits consecutive LBT frames 765, 775, and 785.

In this example, the LBT frames 735, 745, and 755 of the second eNB, and the LBT frames 765, 775, and 785 of the third eNB also are supplemental downlink frames, although similar situations may arise with respect to stand-alone mode and/or carrier aggregation mode frames. If the second eNB is not synchronized with the first eNB, such as illustrated in FIG. 7, the special subframes 730, 740, and 750 of the second eNB may occur during the LBT frames 705-715. Similarly, if the third eNB is not synchronized with the first or second eNBs, such as illustrated in FIG. 7, the special subframes 760, 770, and 780 of the third eNB may occur during the LBT frames 705-715 of the first eNB as well as during the LBT frames 735-755 of the second eNB.

Figure 8:
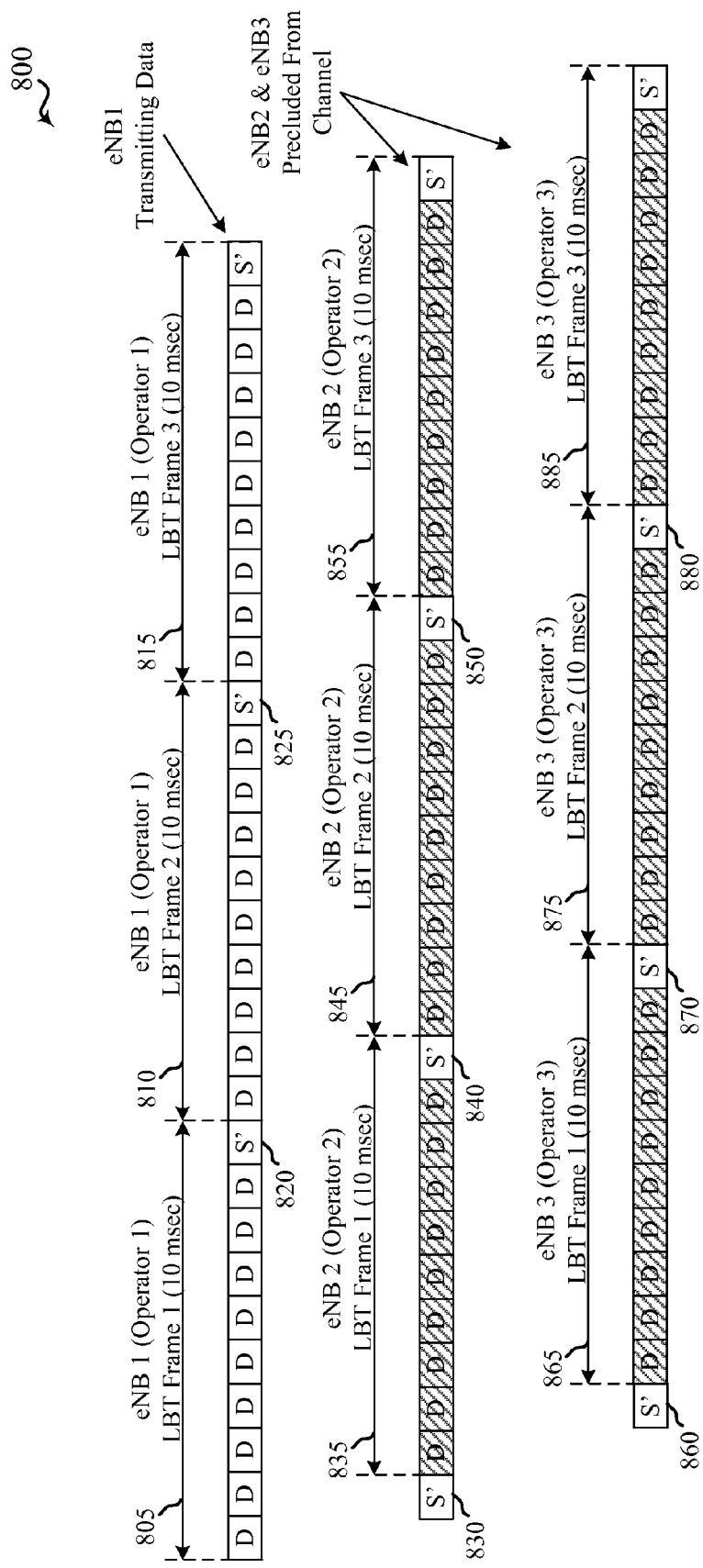
FIG. 8 is a block diagram conceptually illustrating asynchronous radio frames of three different eNBs in which a first eNB may retain channel access for consecutive radio frames in a contention-based radio frequency spectrum band deployment, in accordance with aspects of the present disclosure.

For example, if all three eNBs have data that is to be transmitted to one or more associated UEs, each of the eNBs may attempt to gain channel access to the channel of the radio frequency spectrum band during a contention period in each LBT frame. Such an example is illustrated in FIG. 8, which is a block diagram conceptually illustrating asynchronous radio frames of three different eNBs of there different operators, in which a first eNB may retain channel access for consecutive radio frames in a contention-based radio frequency spectrum band deployment, in accordance with aspects of the present disclosure. In this example, corresponding to the example of FIG. 7, a first eNB (eNB 1) transmits consecutive LBT frames 805, 810, and 815. In this example, the LBT frames 805-815 are supplemental downlink frames, although similar situations may arise with respect to stand-alone mode and/or carrier aggregation mode frames. The first eNB may be part of a deployment of a first operator and transmits data during a first LBT frame 805, and may perform a CCA during special subframe 820. In this example, the first eNB wins contention for the radio frequency spectrum band because the second eNB and the third eNB are precluded to access the channel during frame 835 and 865, respectively, and continues transmitting during second LBT frame 810, and may again perform a CCA during special subframe 825. The first eNB may again win contention for the radio frequency spectrum band because the second eNB and the third eNB are precluded to access the channel during frame 845 and 875, respectively, and continue transmitting during third LBT frame 815. The first eNB would continue on in such a manner until another user of the unlicensed radio frequency spectrum band happened to begin transmitting during a contention period of the first eNB, or until a data buffer at the first eNB is empty.

Meanwhile second eNB may be part of a deployment of a second operator and may perform a CCA during special subframe 830. Because the first eNB is transmitting the second eNB will lose contention and will not transmit in LBT frame 1 835, and not perform another CCA until special subframe 840. At the end of the LBT frame 1 835 the second eNB, which continues to have data to transmit, may again perform a CCA during special subframe 840. Again, because the first eNB is transmitting, the second eNB will lose contention and will not transmit in LBT frame 2 845. At the end of the LBT frame 2 845 the second eNB may again perform a CCA during special subframe 850. Again, because the first eNB is transmitting, the second eNB will lose contention and will not transmit in LBT frame 3 855. The second eNB would continue in such a manner until the first eNB either loses the channel or no longer has data to transmit.

Similarly, third eNB may be part of a deployment of a third operator and may perform a CCA during special subframe 860. Because the first eNB is transmitting the third eNB will lose contention and will not transmit in LBT frame 1 865, and not perform another CCA until special subframe 870. At the end of the LBT frame 1 865 the third eNB, which continues to have data to transmit, may again perform a CCA during special subframe 870. Again, because the first eNB is transmitting, the third eNB will lose contention and will not transmit in LBT frame 2 875. At the end of the LBT frame 2 875 the third eNB may again perform a CCA during special subframe 880. Again, because the first eNB is transmitting, the third eNB will lose contention and will not transmit in LBT frame 3 885. The third eNB would continue in such a manner until the first eNB either loses the channel or no longer has data to transmit.

However, as the second eNB performs CCA in special subframes 830, 840, and 850, the third eNB would not win contention also until the second eNB, as with the first eNB, either loses the channel or no longer has data to transmit. Accordingly, the third eNB in such a situation may be forced to wait for an unacceptably long time for channel access and may have to, for example, fall back to use of the licensed spectrum. Thus, in such situations, the third, and possibly the second, operator will see reduced benefits of offloading transmissions to an unlicensed radio frequency spectrum band. In order to provide enhanced fairness for channel access in such asynchronous deployments, techniques are provided to allow the second and third eNBs to access a radio frequency spectrum band channel more fairly in such scenarios.

Figure 9:
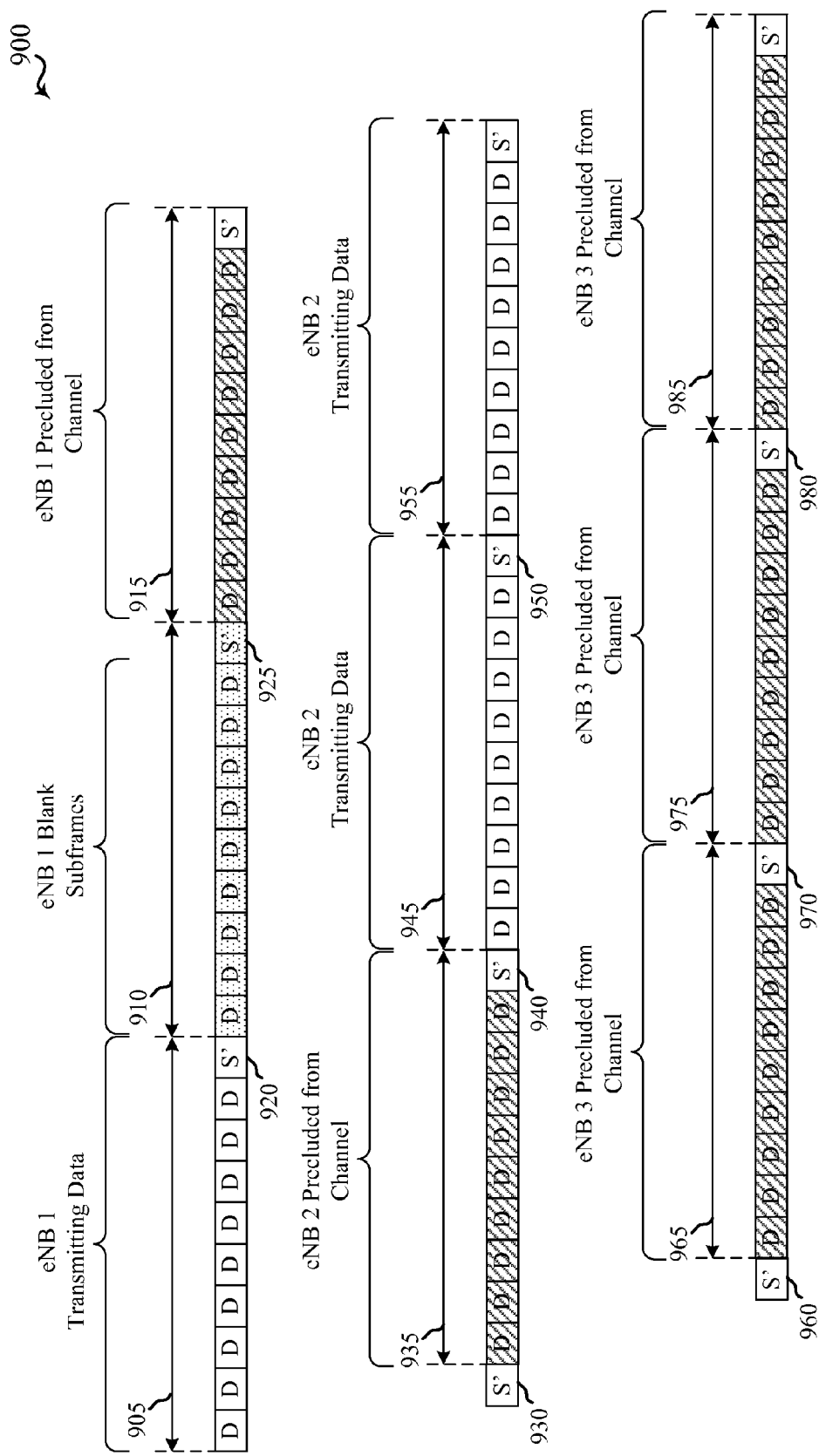
FIG. 9 is a block diagram conceptually illustrating asynchronous radio frames of three different eNBs in which a first eNB may stop transmission following a threshold number of consecutive radio frames in which contention has been won in a contention-based radio frequency spectrum band deployment, in accordance with aspects of the present disclosure.

FIG. 9 is a block diagram 900 conceptually illustrating asynchronous radio frames of three different eNBs in which a first eNB may relinquish occupancy of the radio frequency spectrum band by stopping contention procedures and/or transmissions/receptions following a threshold number of consecutive radio frames in which contention has been won in a contention-based radio frequency spectrum band deployment, in accordance with aspects of the present disclosure. In some examples, portions of example 900 may be carried out by one or more of the access points 105, 205, 305 and/or UEs 115, 215, 315 described with reference to FIG. 1, 2, and/or 3. In the example of FIG. 9, an additional constraint may be added, such as an additional constraint on the medium access control (MAC) protocol for example, that specifies that a node that has transmitted a threshold number (N) of successive LBT frames may then blank a number of frames or subframes.

In the example of FIG. 9, a first eNB (eNB 1), which may be associated with a first operator, transmits during a first LBT frame 905. In this example, the first LBT frame 905 may be equal to or greater than the threshold number of consecutive transmission periods (e.g., LBT frames) for which the first eNB has won contention, and therefore the first eNB may not contend for the radio frequency spectrum band channel during special subframe 920. As mentioned above, the first eNB may be an eNB in a set of coordinated nodes, and the threshold number of consecutive transmission periods may correspond to transmission periods for which contention has been won by any of the nodes of the set of coordinated nodes. In any event, following such a determination, the first eNB may relinquish occupancy of the radio frequency spectrum band (e.g., by stopping contention procedures and/or transmissions/receptions) and have a number of blank subframes in the second LBT frame 910 of the first eNB. In some examples, an eNB may blank a number of subframes, such as, for example, all of the non-special subframes in one LBT frame, before contending for radio frequency spectrum band channel access again. In other examples, an eNB may blank two or more LBT frames. The determination of the number of subframes over which to relinquish occupancy of the radio frequency spectrum band may be, for example, predetermined, signaled to an eNB (or UE) by the core network or other node, and/or dynamically determined based on channel conditions.

The first eNB may then again contend for channel access during special subframe 925, in the example of FIG. 9. However, because special subframe 925 occurs during the LBT frame 945 of the second eNB, the first eNB does not win contention, and is precluded from transmitting on the radio frequency spectrum band channel during LBT frame 915. The second eNB may contend for channel access of the radio frequency spectrum band at special subframe 930, and in this example loses contention and is thus precluded from transmitting during LBT frame 935. The second eNB may then win contention during special subframe 940, and may transmit data during consecutive LBT frames 945 and 955, assuming that the second eNB wins contention at special subframe 950. Accordingly, the second eNB is able to access the radio frequency spectrum band channel. The third eNB, because special subframes 960, 970, and 980 occur during the LBT frames 905-955, during which either the first or second eNB would be transmitting, would not win contention for any of LBT frames 965, 975, or 985, in this example.

In this case, outage to the other eNBs is limited, and would not continue indefinitely for as long as the first eNB has data in its buffer. Once the second eNB secures the radio frequency spectrum band channel during a period of time blanked by the first eNB, the second eNB may retain the channel for a maximum of the threshold number of consecutive LBT frames, after which the second eNB then blanks for a period of time (e.g., at least one LBT frame). In examples having only two asynchronous operators, the first eNB may regain access to the radio frequency spectrum band channel to resume service to its UEs. In examples with more than two asynchronous eNBs, such as the example of FIG. 9, a third eNB may begin serving its UEs. In this manner, asynchronous eNBs may take turns serving their users, thereby providing an equal opportunity for different operators to access the radio frequency spectrum band channel and maintaining uniform quality of service for users in the system. In some examples one blank LBT frame may be sufficient to achieve the desired objective in most cases. In other examples, longer blank periods may be used to add robustness, compensate for potential CCA errors, and/or account for the presence of occasional Wi-Fi interference.

Figure 10:
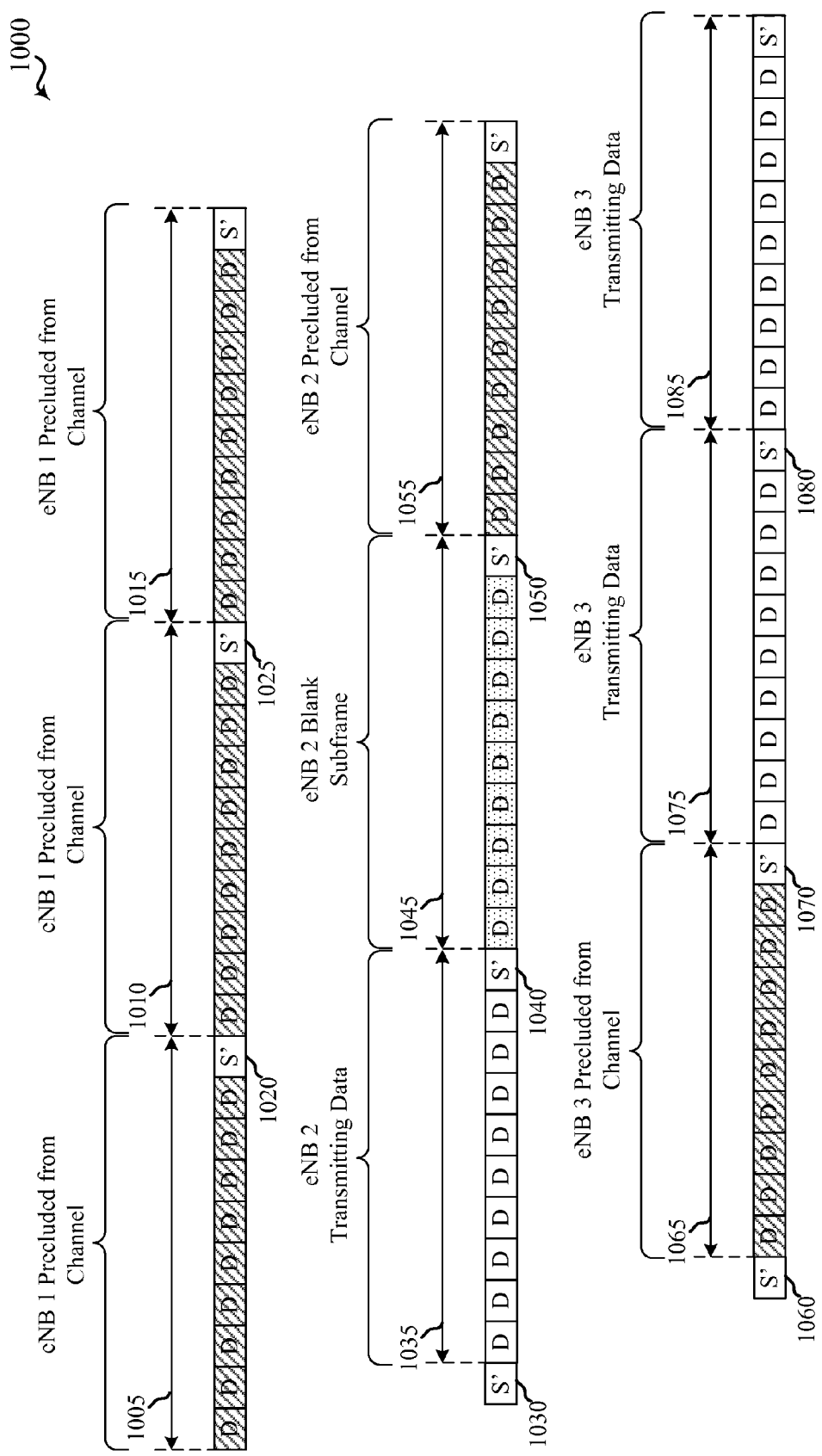
FIG. 10 is a block diagram conceptually illustrating asynchronous radio frames of three different eNBs in which a second eNB may stop transmission following a threshold number of consecutive radio frames in which contention has been won in a contention-based radio frequency spectrum band deployment, in accordance with aspects of the present disclosure.

FIG. 10 is a block diagram 1000 conceptually illustrating asynchronous radio frames of three different eNBs in which a second eNB may relinquish occupancy of a radio frequency spectrum band following a threshold number of consecutive radio frames in which contention has been won in a contention-based radio frequency spectrum band deployment, in accordance with aspects of the present disclosure. In some examples, portions of example 1000 may be carried out by one or more of the access points 105, 205, 305 and/or UEs 115, 215, 315 described with reference to FIG. 1, 2, and/or 3.

In this example, the first eNB (eNB 1), which may be associated with a first operator, has lost contention and is precluded from transmitting during first LBT frame 1005. Second eNB, which may be associated with a second operator, may win radio frequency spectrum band channel contention during a CCA procedure in special subframe 1030, and transmit data during LBT frame 1035. First eNB will continue to be precluded from transmitting during LBT frame 1010, as special subframe 1020 occurs during transmission by the second eNB of LBT frame 1035. In this example, the LBT frame 1035 may be equal to or greater than the threshold number of consecutive LBT frames for which the second eNB has won contention, and therefore the second eNB may not contend for the radio frequency spectrum band channel during special subframe 1040. The second eNB may thus stop transmitting and relinquish occupancy of the radio frequency spectrum band channel during the second LBT frame 1045 of the second eNB.

The third eNB, which may be associated with a third operator, is precluded from transmitting during LBT frame 1065 because second eNB is already transmitting before third eNB performs its CCA procedure during special subframe 1060. The third eNB may contend for radio frequency spectrum band channel access during special subframe 1070 and win contention, because special subframe 1070 is ahead of special subframes 1025 and 1050. The third eNB may then transmit data in LBT frame 1075. Because first and second eNBs lost contention, they are precluded from transmitting during LBT frames 1015 and 1055, respectively. The third eNB thus may again win contention during special subframe 1080, and transmit during LBT frame 1085, and continue to win contention until contention is won for a threshold number of consecutive transmission periods, or until its data buffer is empty. Once the third eNB relinquishes occupancy of the radio frequency spectrum band following the threshold number of successful contentions, the first eNB may then win contention in this example, based on the timing of the special subframes of the first eNB relative to the second and third eNBs. Thus, winning contention may be considered as having a token, which may be passed from one asynchronous operator deployment to the next in a round-robin fashion, ensuring that all operator deployments have a chance to transmit at least some of their data before the first deployment gets to resume its transmission.

According to the examples of FIGS. 9 and 10, each eNB blanks a number of LBT frames even if there are no other asynchronous operator deployments that could benefit from the blanking According to some examples, relinquishing occupancy of the radio frequency spectrum band may be invoked only if certain other conditions are met, thus allowing an eNB to continue transmissions as long as data is present to be transmitted. In some examples, a UE may determine that one or more asynchronous operators are within range of the eNB. Such a determination may be made through signaling received at the eNB, such as through an X2 interface, via a UE in communication with the other eNB, and/or through monitoring of transmissions from other eNBs, for example.

In some examples, each eNB may periodically transmit system information. For example, eNBs may transmit system information with a certain fixed periodicity such as once every 80 milliseconds. These relatively low-duty cycle transmissions may be exempt from CCA requirements due to a length of the transmission and relatively infrequent transmission. Such transmissions are referred to as CCA exempt transmissions (CETs), and may include information such as an identification of the eNB and an amount of data in the eNBs queue that is to be transmitted using the unlicensed radio frequency spectrum band. The CET signal is to enable discovery of an eNB by UEs that can be served by it. But this mechanism may enable discovery of the eNB by other UEs and eNBs, which may possibly belong to other deployments.

In some examples, an eNB may use CETs to determine the presence or absence of any asynchronous eNBs. In such examples, periodically, such as once every two minutes, an eNB may discontinue transmissions (DTX) for a certain time period (e.g., 200-300 milliseconds) during which it monitors the channel for CET signals from other eNBs. If the eNB detects other asynchronous eNBs within its LBT threshold (e.g., −62 dBm/20 MHz), then it may then enable the above-described blanking mechanism for the next active (non-dormant) period (e.g., for 2 minutes, in the above example). Additionally or alternatively, upon detection of other asynchronous eNBs, an eNB may configures its UEs to monitor the CET transmissions from the specific asynchronous eNBs on a periodic basis, and report certain information elements from the monitored CET signals back to the serving eNB.

In some examples, a UE may report the information elements in the CET signals, such as, for example, an indication of the amount of data backlog at the eNB transmitting the CET signals. If the UE reports indicate that the asynchronous eNBs that are within the LBT threshold have a large-enough data backlog in their queues, then the given eNB turns on the blanking mechanism, enabling the other asynchronous eNBs to take turns serving their users. Once the UE reports that the asynchronous eNBs have little or no backlog for a sufficiently long duration of time, or that the asynchronous eNBs have stopped transmitting their CET for a relatively long duration of time, the eNB may discontinue relinquishing occupancy of the radio frequency spectrum band based on the threshold number of consecutive CCAs of the eNB.

Figure 11:
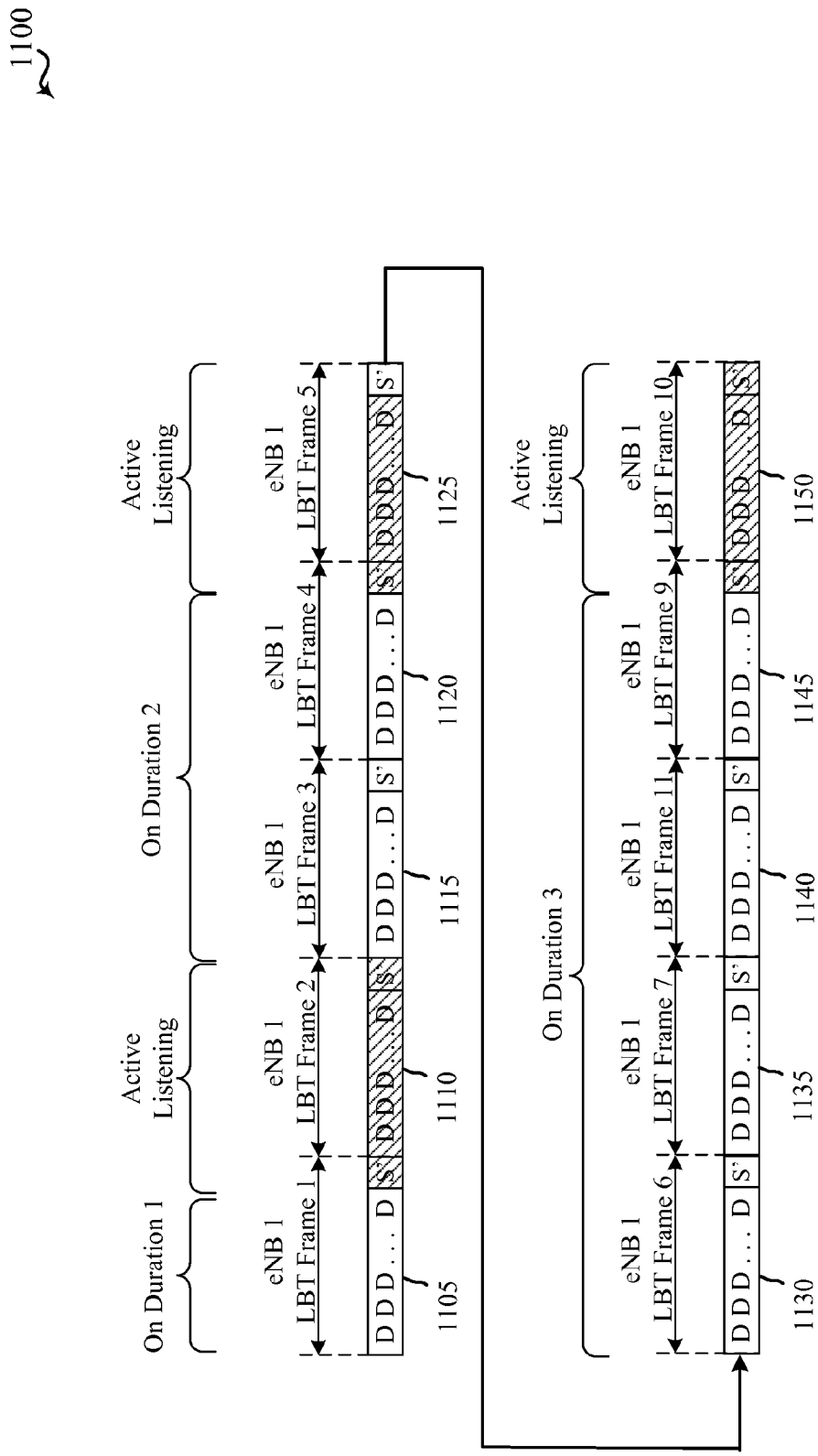
FIG. 11 is a block diagram conceptually illustrating radio frames in which an eNB may actively listen for transmissions of other access points following adaptively determined on durations, in accordance with aspects of the present disclosure.

FIG. 11 is a block diagram 1100 conceptually illustrating radio frames in which an eNB may actively listen for transmissions of other access points following adaptively determined on durations, in accordance with aspects of the present disclosure. In some examples, the threshold number of consecutive transmission periods for which contention has been won may be modified based on information from other eNBs, for example. In some examples, an eNB may switch to listening mode, similarly to listening procedures performed in CCA operations, when it relinquishes occupancy of the radio frequency spectrum band (e.g., stops performing contention procedures and/or transmissions/receptions) due to winning the threshold number of consecutive transmission periods. In FIG. 11, a first eNB may transmit data in LBT frame 1105, during an "on" duration. In this example, the LBT frame 1105 corresponds to a frame in which the first eNB has won the threshold number of consecutive transmission periods, and the first eNB then stops transmissions for LBT frame 1110, and engages in active listening for CET signals.

Based on the measurement results, the eNB may determine whether there is transmission activity from other devices or not and those devices which may come from different operators. If the eNB determines that there is no transmission activity during such a listening period, as illustrated in FIG. 11, the eNB may increase the next "on" duration, which may correspond to the threshold number of consecutive transmission periods. In the example if FIG. 11, the initial on duration is set to one LBT frame, and this duration is increased to allow transmission of LBT frames 1115 and 1120 before stopping transmission and engaging in active listening for LBT frame 1125. If the eNB determines that there is no transmission activity during LBT frame 1125, as illustrated in FIG. 11, the eNB again may increase the next "on" duration. In this example, the third on duration is increased to cover LBT frames 1130, 1135, 1140, and 1145, and then the eNB stops transmission for LBT frame 1150, and again may actively listed for other eNBs.

According to some examples, a maximum threshold value of consecutive transmission periods may be implemented, such that the maximum "on" duration is limited. In the event that one or more other eNBs are detected, the eNB may decrease its next or future "on" duration value. In another example, the eNB may decrease its next or future "on" duration value based at least in part on a number of other asynchronous eNB detected. For example, the eNB may decrease its next or future "on" duration value from three to two if one other asynchronous eNB is detected or from three to one if two or more asynchronous eNB is detected. In some examples, a minimum threshold value may be implemented. In other examples, an eNB, during active listening, may determine whether traffic activity is coming from unlicensed radio frequency spectrum band technologies or other technologies, for example, Wi-Fi, and then use different strategies to adjust "on" duration value. For example, if a transmission is detected from a Wi-Fi operator, an eNB may maintain its current "on" duration value, because Wi-Fi nodes may not operate in a coordinated manner and adjusting the "on" duration value therefore would not enhance the ability of such a Wi-Fi node to access the radio frequency spectrum band. In other examples, traffic activity may be determined to be from a device that in known to operate in a synchronized system, and thus the eNB's "on" duration may be adjusted to allow fair access to such a device.

In some examples, a specific algorithm may be used to determine the threshold number of frames that may be consecutively transmitted. In the algorithm, a value N_min may be used to identify a minimum number of "on" subframes, N_max may be used to identify a maximum number of "on" subframes, N_current may be used to identify a current number of "on" subframes before stopping transmissions, and N_update may be used to identify a number of "on" subframes to be used following one or more current blank subframes. The algorithm of these examples may include:

a) Initialize N_current=N_min
b) During K blank subframes, eNB does CCA for a duration of M subframes and determine a metric (e.g., number of asynchronous eNBs) to compare it with a predefined threshold
- If the metric is larger than the threshold
  - N_update=2*N_current
- Else
  - N_update=N_min
c) Go back to step (b)

Thus, the threshold number for the consecutive number of transmission periods may be adaptively set based on current conditions experiences by an eNB, and efficiency of a wireless communications system may be enhanced.

In some examples, an eNB and/or UE may utilize multiple carriers. The multiple carriers may be within one or more unlicensed frequency spectrum bands, one or more licensed frequency spectrum bands, or a combination thereof. In some examples, the techniques described herein may be modified to utilize the multiple carriers in multiple unlicensed frequency spectrum bands. For example, the transmission periods in the algorithm described above may be for a first carrier within a first unlicensed frequency spectrum band. During the K blank subframes of the first carrier, an eNB or UE may utilize a second carrier within a second radio frequency spectrum band (either licensed or unlicensed) to carry out transmissions for a period equal to the K subframes. After the K subframes, occupancy of the second carrier may be relinquished, and the transmissions may be carried out on the first carrier for a number of transmission periods.

By continuing a transmission over a second carrier of a second radio frequency spectrum band (either licensed or unlicensed) when occupancy of the first carrier is relinquished, an eNB or UE may experience less service disruption. For example, the first carrier in a first unlicensed radio frequency spectrum band and the second carrier in a second unlicensed radio frequency spectrum band may include a plurality of subcarriers combined or aggregated into a single "virtual carrier" that may provide for substantially continuous communications. The first carrier may be "on" for N subframes, and blank for K subframes, while the second carrier may be "on" for the K subframes, and blank for the N subframes. By utilizing blank subframes in both the first carrier and the second carrier, fairness in access to each of the plurality of radio frequency spectrum bands may be maintained according to a contention-based access protocol.

Figure 12A:
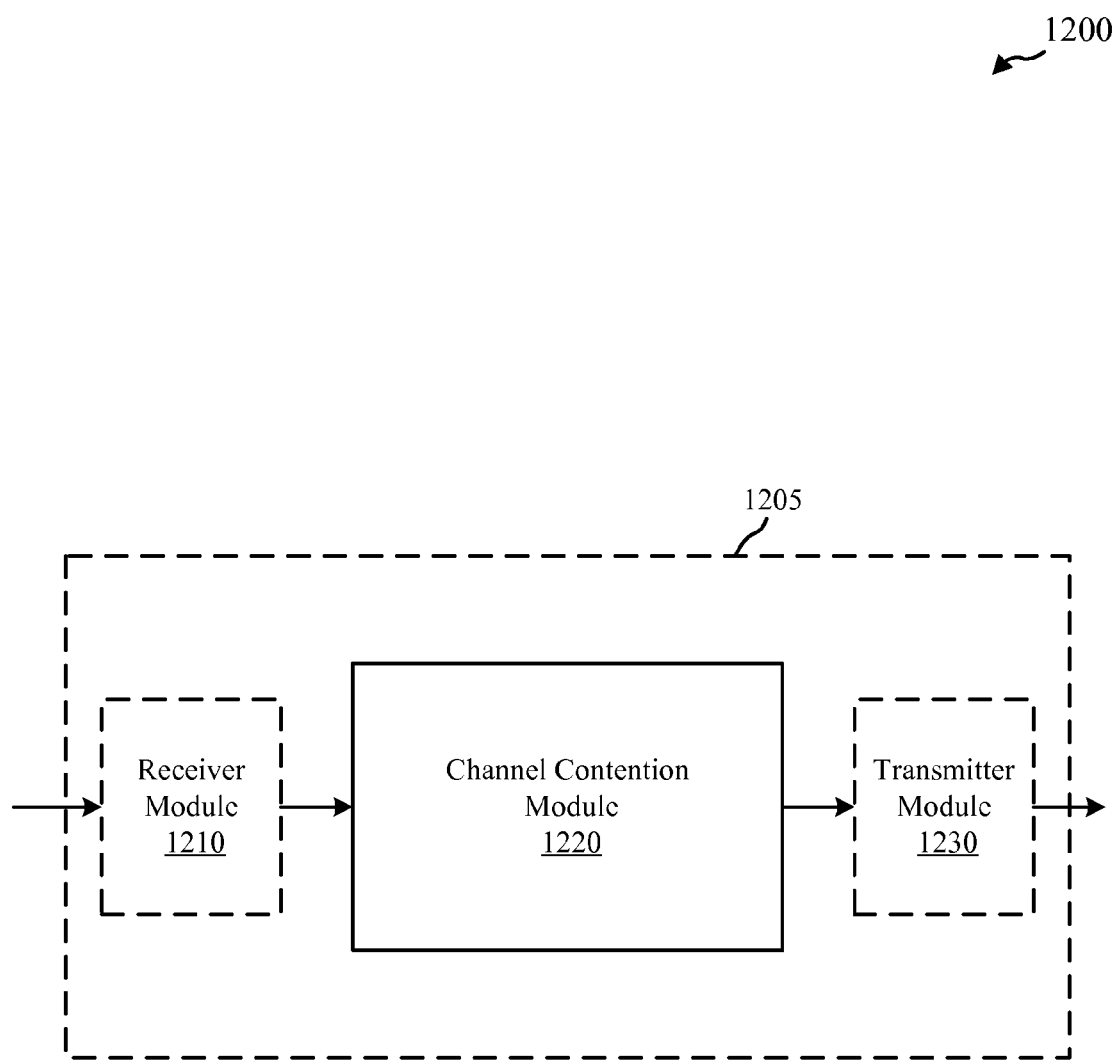
FIGS. 12A and 12B are block diagrams conceptually illustrating devices, such as eNBs or UEs, for use in wireless communications, in accordance with aspects of the present disclosure.
Figure 12B:
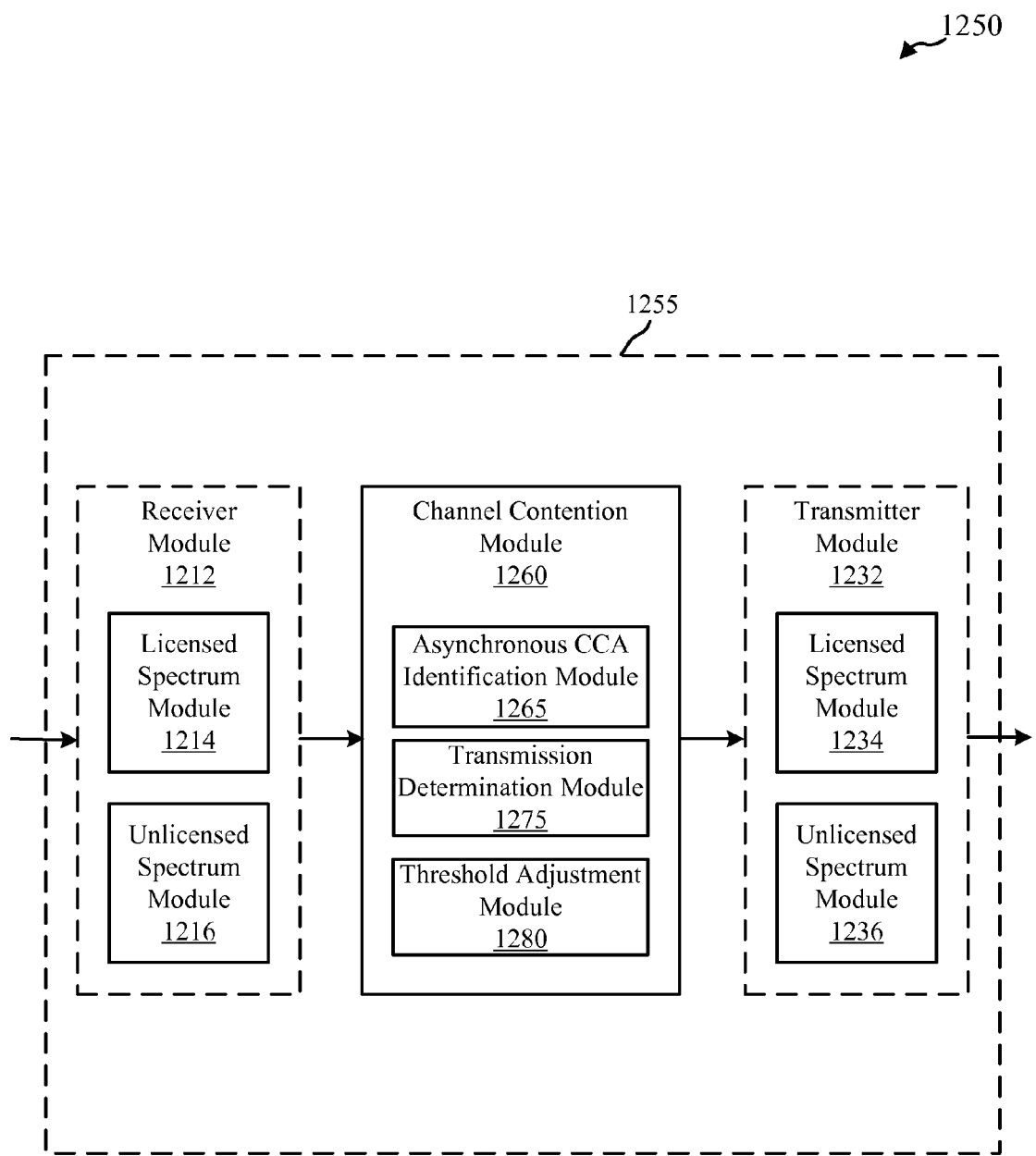

FIGS. 12A and 12B are block diagrams conceptually illustrating devices, such as eNBs or UEs, for use in wireless communications, in accordance with aspects of the present disclosure. Referring first to FIG. 12A, a block diagram 1200 illustrates a device 1205 for use in wireless communications, in accordance with various examples. In some examples, the device 1205 may be an example of one or more aspects of the access points 105, 205, 305, and/or UEs 115, 215, 315 described with reference to FIG. 1, 2, and/or 3. The device 1205 may also be a processor. The device 1205 may include a receiver module 1210, a channel contention module 1220, and/or a transmitter module 1230. Each of these components may be in communication with each other.

The components of the device 1205 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be or include a radio frequency (RF) receiver, such as an RF receiver operable to receive transmissions in a licensed spectrum (e.g., an LTE spectrum) and/or an unlicensed radio frequency spectrum band. The receiver module 1210 may be used to receive various types of data and/or control signals (i.e., transmissions) over one or more communication links of a wireless communications system including the licensed and unlicensed radio frequency spectrum bands, such as one or more communication links of the wireless communications system 100, 200, and/or 300 described with reference to FIG. 1, 2, and/or 3.

In some examples, the transmitter module 1230 may be or include an RF transmitter, such as an RF transmitter operable to transmit in the licensed spectrum and/or the unlicensed radio frequency spectrum band. The transmitter module 1230 may be used to transmit various types of data and/or control signals (i.e., transmissions) over one or more communication links of a wireless communications system, such as one or more communication links of the wireless communications system 100, 200, and/or 300 described with reference to FIG. 1, 2, and/or 3. In some examples, the channel contention module 1220 may configure and/or perform CCA procedures, including relinquishing occupancy of the radio frequency spectrum band according to a determination of a number of consecutive transmission periods for which contention is won relative to a threshold value, such as described above with respect to FIGS. 4-11, for example.

Referring now to FIG. 12B, a block diagram 1250 illustrates a device 1255 for use in wireless communications, in accordance with various examples. In some examples, the device 1205 may be an example of one or more aspects of the access points 105, 205, 305 and/or UEs 115, 215, 315 described with reference to FIG. 1, 2 and/or 3. The device 1205 may also be a processor. The device 1255 may include a receiver module 1212, a channel contention module 1260, and/or a transmitter module 1232. Each of these components may be in communication with each other.

The components of the device 1255 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1212 may be an example of the receiver module 1210 of FIG. 12A. The receiver module 1212 may be or include a radio frequency (RF) receiver, such as an RF receiver operable to receive transmissions in a licensed spectrum (e.g., an LTE spectrum) and/or an unlicensed radio frequency spectrum band. The RF receiver may include separate receivers for the licensed spectrum and the unlicensed radio frequency spectrum band. The separate receivers may in some cases take the form of a licensed spectrum module 1214 and an unlicensed spectrum module 1216. The receiver module 1212, including the licensed spectrum module 1214 and the unlicensed spectrum module 1216, may be used to receive various types of data and/or control signals (i.e., transmissions) over one or more communication links of a wireless communications system including the licensed and unlicensed radio frequency spectrum bands, such as one or more communication links of the wireless communications system 100, 200 and/or 300 described with reference to FIG. 1, 2 and/or 3.

In some examples, the transmitter module 1232 may be an example of the transmitter module 1230 of FIG. 12A. The transmitter module 1232 may be or include an RF transmitter, such as an RF transmitter operable to transmit in the licensed spectrum and/or the unlicensed radio frequency spectrum band. The RF transmitter may include separate transmitters for the licensed spectrum and the unlicensed radio frequency spectrum band. The separate transmitters may in some cases take the form of a licensed spectrum module 1234 and an unlicensed spectrum module 1236. The transmitter module 1232 may be used to transmit various types of data and/or control signals (i.e., transmissions) over one or more communication links of a wireless communications system, such as one or more communication links of the wireless communications system 100, 200 and/or 300 described with reference to FIG. 1, 2 and/or 3.

The channel contention module 1260 may be an example of the channel contention module 1220 described with reference to FIG. 12A and may include an asynchronous CCA identification module 1265, a transmission determination module 1275, and/or a threshold adjustment module 1280. Each of these components may be in communication with each other.

In some examples, the asynchronous CCA identification module 1265 may determine whether one or more other operators are present that may be transmitting with asynchronous transmission periods relative to device 1255. The asynchronous CCA identification module 1265 may, for example, monitor for one or more signals from asynchronous operators, and/or receive signaling indicating that one or more asynchronous operators are present. The asynchronous CCA identification module 1265 may, in some examples, determine a number of other asynchronous operators, an amount of data that one or more asynchronous operators has buffered to transmit, and/or perform functions related to identification of other asynchronous nodes such as described above with respect to FIGS. 4-11, for example.

In some examples, the transmission determination module 1280 may make a determination the device 1255 has won contention for a transmission period that may be equal to or greater than the threshold number of consecutive transmission periods, and therefore whether the device 1255 should continue sending transmissions or relinquish occupancy of the radio frequency spectrum band for a period of time. The threshold number of consecutive transmission periods may correspond to transmission periods for which contention has been won by any nodes of a set of coordinated nodes to which device 1255 belongs. In any event, following such a determination, the device 1255 may relinquish occupancy of the radio frequency spectrum band and have a number of blank subframes in one or more subsequent transmission periods identified by the transmission determination module 1280, such as described above with respect to FIGS. 4-11, for example. Threshold adjustment module 1280 may, in some examples, make one or more adjustments to one or more threshold levels that may be used by the asynchronous CCA identification module 1265 and/or transmission determination module 1275. Threshold levels may relate to a number of consecutive transmission periods for which contention has been won, a number of other asynchronous operators, an amount of data to be transmitted by one or more other operators, and/or any other threshold levels such as described above with respect to FIGS. 4-11, for example.

Figure 13:
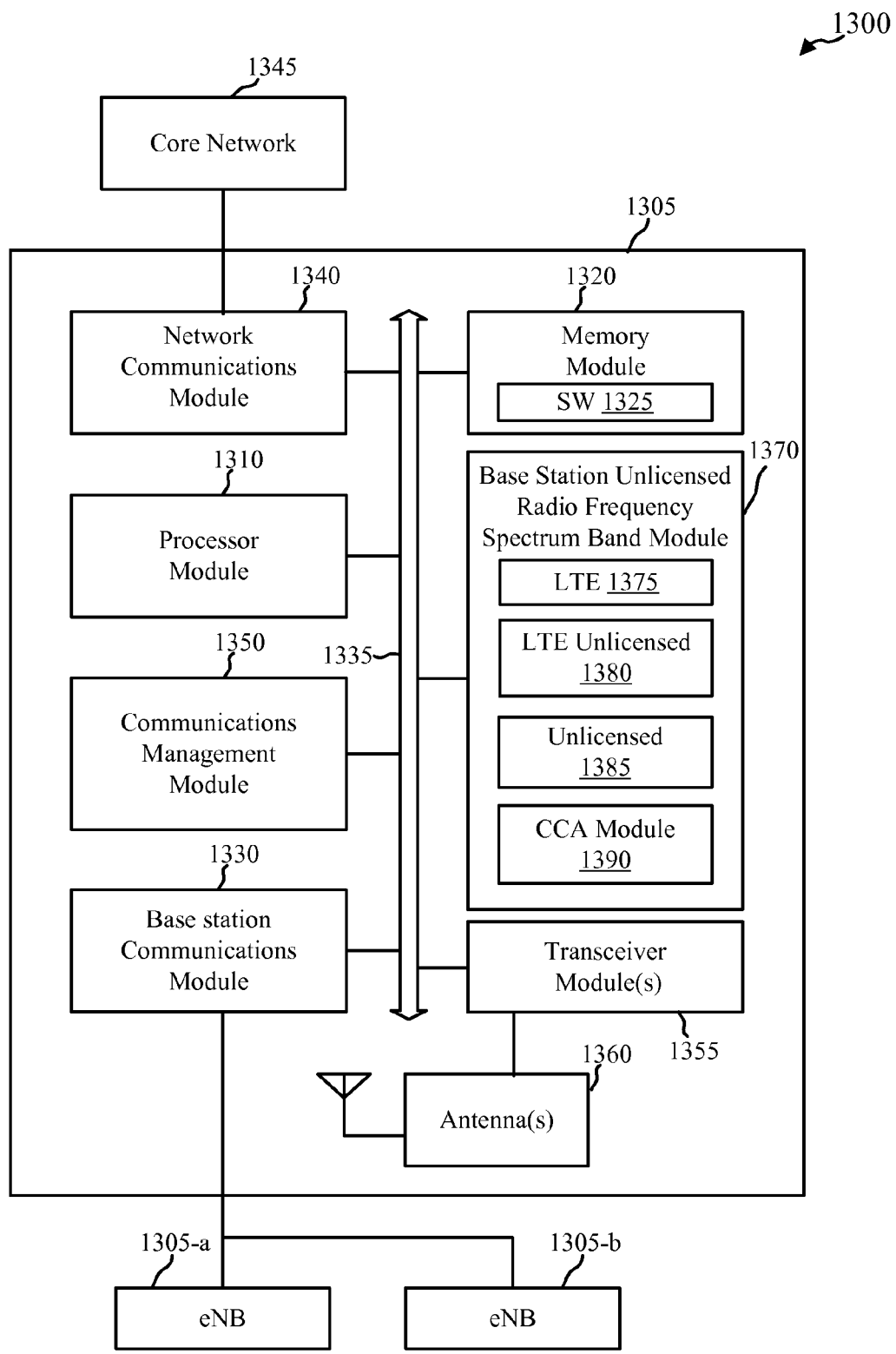
FIG. 13 is a block diagram conceptually illustrating a design of a base station, in accordance with aspects of the present disclosure.

FIG. 13 is a block diagram 1300 conceptually illustrating a design of a base station, in accordance with aspects of the present disclosure. In some examples, the base station 1305 may be an example of one or more aspects of the base stations, eNBs, or devices 105, 205, 305, 1205, and/or 1255 described with reference to FIG. 1, 2, 3, 12A, and/or 12B. The base station 1305 may be configured to implement at least some of the features and functions for operations in the presence of one or more asynchronous operators described with respect to FIG. 1, 2, 3, 4A, 4B, 5, 6, 7, 8, 9, 10, 11, 12A, and/or 12B. The base station 1305 may include a processor module 1310, a memory module 1320, at least one transceiver module (represented by transceiver module(s) 1355), at least one antenna (represented by antenna(s) 1360), and/or a base station unlicensed radio frequency spectrum band module 1370. The base station 1305 may also include one or both of a base station communications module 1330 and a network communications module 1340. Each of these components may be in communication with each other, directly or indirectly, over one or more buses 1335.

The memory module 1320 may include random access memory (RAM) and/or read-only memory (ROM). The memory module 1320 may store computer-readable, computer-executable software (SW) code 1325 containing instructions that are configured to, when executed, cause the processor module 1310 to perform various functions described herein for using LTE-based communications in a licensed and/or unlicensed radio frequency spectrum band, including the performance of CCA and modification CCA or transmission operations. Alternatively, the software code 1325 may not be directly executable by the processor module 1310 but be configured to cause the base station 1305, e.g., when compiled and executed, to perform various of the functions described herein.

The processor module 1310 may include an intelligent hardware device, e.g., a central processing unit (CPU), a microcontroller, an ASIC, etc. The processor module 1310 may process information received through the transceiver module(s) 1355, the base station communications module 1330, and/or the network communications module 1340. The processor module 1310 may also process information to be sent to the transceiver module(s) 1355 for transmission through the antenna(s) 1360, to the base station communications module 1330 for transmission to one or more other base stations or base stations 1305-*a* and 1305-*b*, and/or to the network communications module 1340 for transmission to a core network 1345, which may be an example of aspects of the core network 130 described with reference to FIG. 1. The processor module 1310 may handle, alone or in connection with the base station unlicensed radio frequency spectrum band module 1370, various aspects of using LTE-based communications in a licensed and/or unlicensed radio frequency spectrum band, including the performance of CCA and transmissions during transmission periods, such as described above.

The transceiver module(s) 1355 may include a modem configured to modulate the packets and provide the modulated packets to the antenna(s) 1360 for transmission, and to demodulate packets received from the antenna(s) 1360. The transceiver module(s) 1355 may be implemented as one or more transmitter modules and one or more separate receiver modules. The transceiver module(s) 1355 may support communications in at least one licensed spectrum (e.g., an LTE spectrum) and in at least one unlicensed radio frequency spectrum band. The transceiver module(s) 1355 may be configured to communicate bi-directionally, via the antenna(s) 1360, with one or more of the UEs or devices 115, 215, and/or 315 described with reference to FIG. 1, 2, and/or 3, for example. The base station 1305 may include multiple antennas 1360 (e.g., an antenna array). The base station 1305 may communicate with the core network 1345 through the network communications module 1340. The base station 1305 may communicate with other base stations or base stations, such as the base stations 1305-*a* and 1305-*b*, using the base station communications module 1330.

According to the architecture of FIG. 13, the base station 1305 may further include a communications management module 1350. The communications management module 1350 may manage communications with other base stations, base stations, and/or devices. The communications management module 1350 may be in communication with some or all of the other components of the base station 1305 via the bus or buses 1335. Alternatively, functionality of the communications management module 1350 may be implemented as a component of the transceiver module(s) 1355, as a computer program product, and/or as one or more controller elements of the processor module 1310.

The base station unlicensed radio frequency spectrum band module 1370 may be configured to perform and/or control some or all of the base station functions or aspects described with reference to FIG. 1, 2, 3, 4A, 4B, 5, 6, 7, 8, 9, 10, 11, 12A, and/or 12B related to using LTE-based communications in a licensed and/or unlicensed radio frequency spectrum band. For example, the base station unlicensed radio frequency spectrum band module 1370 may be configured to support CCA procedures and radio frequency spectrum band transmissions such as described above. The base station unlicensed radio frequency spectrum band module 1370 may include an LTE module 1375 configured to handle LTE communications, an LTE unlicensed module 1380 configured to handle unlicensed radio frequency spectrum band communications and CCA, and/or an unlicensed module 1385 configured to handle other communications in an unlicensed radio frequency spectrum band. The base station unlicensed radio frequency spectrum band module 1370 may also include a CCA module 1390 configured to provide, for example, any of the configured to support CCA procedures and radio frequency spectrum band transmission functions described with reference to FIG. 1, 2, 3, 4A, 4B, 5, 6, 7, 8, 9, 10, 11, 12A and/or 12B. The CCA module 1391 may be an example of similar modules (e.g., module 1220 and/or module 1260) described with reference to FIG. 12A and/or 12B. The base station unlicensed radio frequency spectrum band module 1370, or portions of it, may include a processor and/or some or all of the functionality of the base station unlicensed radio frequency spectrum band module 1370 may be performed by the processor module 1310 and/or in connection with the processor module 1310.

Figure 14:
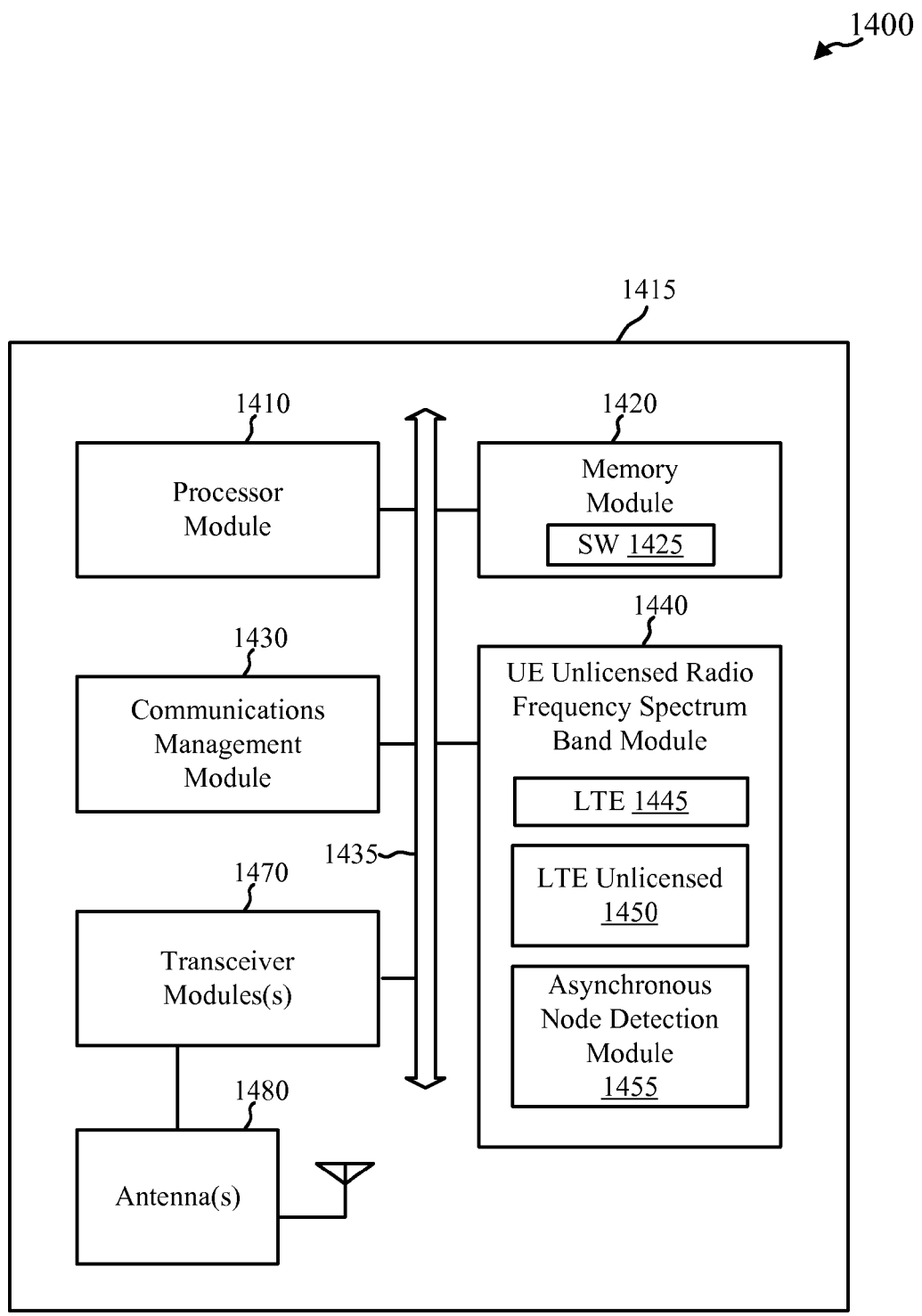
FIG. 14 is a block diagram conceptually illustrating a design of a UE, in accordance with aspects of the present disclosure.

FIG. 14 is a block diagram 1400 conceptually illustrating a design of a UE 1415, in accordance with aspects of the present disclosure. The UE 1415 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1415 may have an internal power supply (not shown), such as a small battery, to facilitate mobile operation. In some examples, the UE 1415 may be an example of one or more of the UEs or devices 115, 215, and/or 315 described with reference to FIG. 1, 2 and/or 3. The UE 1415 may be configured to communicate with one or more of the eNBs or devices 105, 205, 305, 1205, 1255, and/or 1405 described with reference to FIG. 1, 2, 3, 12A, 12B, and/or 13.

The UE 1415 may include a processor module 1410, a memory module 1420, at least one transceiver module (represented by transceiver module(s) 1470), at least one antenna (represented by antenna(s) 1480), and/or a UE unlicensed radio frequency spectrum band module 1440. Each of these components may be in communication with each other, directly or indirectly, over one or more buses 1435.

The memory module 1420 may include RAM and/or ROM. The memory module 1420 may store computer-readable, computer-executable software (SW) code 1425 containing instructions that are configured to, when executed, cause the processor module 1410 to perform various functions described herein for using LTE-based communications in a licensed and/or unlicensed radio frequency spectrum band. Alternatively, the software code 1425 may not be directly executable by the processor module 1410 but be configured to cause the UE 1415 (e.g., when compiled and executed) to perform various of the UE functions described herein.

The processor module 1410 may include an intelligent hardware device, e.g., a CPU, a microcontroller, an ASIC, etc. The processor module 1410 may process information received through the transceiver module(s) 1470 and/or information to be sent to the transceiver module(s) 1470 for transmission through the antenna(s) 1480. The processor module 1410 may handle, alone or in connection with the UE unlicensed radio frequency spectrum band module 1440, various aspects of using LTE-based communications in a licensed and/or unlicensed radio frequency spectrum band.

The transceiver module(s) 1470 may be configured to communicate bi-directionally with eNBs. The transceiver module(s) 1470 may be implemented as one or more transmitter modules and one or more separate receiver modules. The transceiver module(s) 1470 may support communications in at least one licensed spectrum (e.g., an LTE spectrum) and in at least one unlicensed radio frequency spectrum band. The transceiver module(s) 1470 may include a modem configured to modulate the packets and provide the modulated packets to the antenna(s) 1480 for transmission, and to demodulate packets received from the antenna(s) 1480. While the UE 1415 may include a single antenna, there may be examples in which the UE 1415 may include multiple antennas 1480.

According to the architecture of FIG. 14, the UE 1415 may further include a communications management module 1430. The communications management module 1430 may manage communications with various base stations or eNBs. The communications management module 1430 may be a component of the UE 1415 in communication with some or all of the other components of the UE 1415 over the one or more buses 1435. Alternatively, functionality of the communications management module 1430 may be implemented as a component of the transceiver module(s) 1470, as a computer program product, and/or as one or more controller elements of the processor module 1410.

The UE unlicensed radio frequency spectrum band module 1440 may be configured to perform and/or control some or all of the UE unlicensed radio frequency spectrum band functions or aspects described in FIG. 1, 2, 3, 4A, 4B, 5, 6, 7, 8, 9, 10, 11, 12A, and/or 12B related to using LTE-based communications in a licensed and/or unlicensed radio frequency spectrum band. For example, the UE unlicensed radio frequency spectrum band module 1440 may be configured to perform CCA to gain channel access, and relinquish occupancy of the radio frequency spectrum band based on a threshold number of consecutive transmission periods for which CCA has been won. The UE unlicensed radio frequency spectrum band module 1440 may include an LTE module 1445 configured to handle LTE communications, an LTE unlicensed module 1450 configured to handle unlicensed radio frequency spectrum band communications, and/or an asynchronous node detection module 1455. The asynchronous node detection module 1455 may detect the presence of one or more asynchronous nodes through, for example, monitoring of CET transmissions from other nodes, and provide such information to one or more base stations. The UE unlicensed radio frequency spectrum band module 1440 may be an example of similar modules (e.g., module 1220 and/or module 1260) described with reference to FIG. 12A and/or 12B. The UE unlicensed radio frequency spectrum band module 1440, or portions of it, may include a processor and/or some or all of the functionality of the UE unlicensed radio frequency spectrum band module 1440 may be performed by the processor module 1410 and/or in connection with the processor module 1410.

Figure 15:
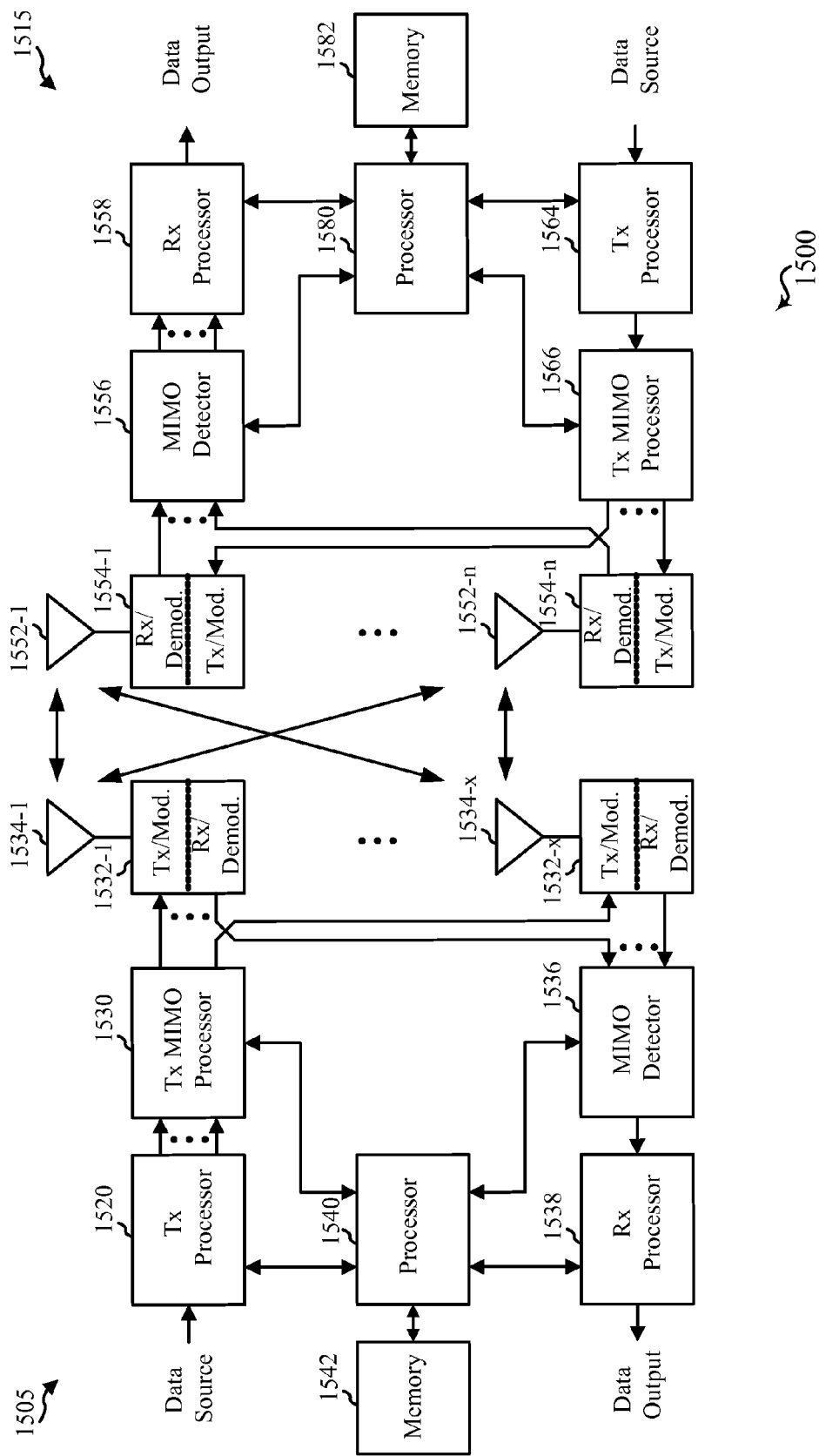
FIG. 15 is a block diagram conceptually illustrating an example of a UE and a base station, in accordance with aspects of the present disclosure.

FIG. 15 is a block diagram conceptually illustrating an example of a UE 1515 and a base station 1505, in accordance with aspects of the present disclosure. The base station 1505 and UE 1515 may be part of a communication system 1500. This communication system 1500 may illustrate aspects of the wireless communications system 100 of FIG. 1, 200 of FIG. 2, and/or 300 of FIG. 3. For example, the base station 1505 may be an example of one or more of the access points, base stations, or access points 105, 205, 305, and/or 1305 described above with respect to FIGS. 1-3 and/or 13, and the UE 1515 may be an example of one or more of the UEs 115, 215, 315, and/or 1415 described above with respect to FIGS. 1-3 and/or 14.

The base station 1505 may be equipped with base station antennas 1534-1 through 1534-$x$, where x is a positive integer, and the UE 1515 may be equipped with UE antennas 1552-1 through 1552-$n$. In the communication system 1500, the base station 1505 may be able to send data over multiple communication links at the same time. Each communication link may be called a "layer" and the "rank" of the communication link may indicate the number of layers used for communication. For example, in a 2×2 MIMO system where base station 1505 transmits two "layers," the rank of the communication link between the base station 1505 and the UE 1515 is two.

At the base station 1505, a base station transmit processor 1520 may receive data from a base station data source and control information from a base station processor 1540. The control information may be for the PBCH, PCFICH, PHICH, PDCCH, etc. The data may be for the PDSCH, etc. The base station transmit processor 1520 may process (e.g., encode and symbol map) the data and control information to obtain data symbols and control symbols, respectively. The base station transmit processor 1520 may also generate reference symbols, e.g., for the PSS, SSS, and cell-specific reference signal. A base station transmit (TX) MIMO processor 1530 may perform spatial processing (e.g., precoding) on data symbols, control symbols, and/or reference symbols, if applicable, and may provide output symbol streams to the base station transmit modulators 1532-1 through 1532-*x*. Each base station modulator 1532 may process a respective output symbol stream (e.g., for OFDM, etc.) to obtain an output sample stream. Each base station modulator 1532 may further process (e.g., convert to analog, amplify, filter, and upconvert) the output sample stream to obtain a downlink (DL) signal. In one example, DL signals from base station modulators 1532-1 through 1532-*x* may be transmitted via the base station antennas 1534-1 through 1534-*x*, respectively.

At the UE 1515, the UE antennas 1552-1 through 1552-*n* may receive the DL signals from the base station 1505 and may provide the received signals to the UE demodulators 1554-1 through 1554-*n*, respectively. Each UE demodulator 1554 may condition (e.g., filter, amplify, downconvert, and digitize) a respective received signal to obtain input samples. Each UE demodulator 1554 may further process the input samples (e.g., for OFDM, etc.) to obtain received symbols. A UE MIMO detector 1556 may obtain received symbols from all the demodulators 1554-1 through 1554-*n*, perform MIMO detection on the received symbols if applicable, and provide detected symbols. A UE receive (Rx) processor 1558 may process (e.g., demodulate, deinterleave, and decode) the detected symbols, providing decoded data for the UE 1515 to a data output, and provide decoded control information to a UE processor 1580, or UE memory 1582.

On the uplink (UL), at the UE 1515, a UE transmit processor 1564 may receive and process data from a UE data source. The UE transmit processor 1564 may also generate reference symbols for a reference signal. The symbols from the UE transmit processor 1564 may be precoded by a UE transmit MIMO processor 1566 if applicable, further processed by the UE demodulators 1554-*a* through 1554-*n* (e.g., for SC-FDMA, etc.), and be transmitted to the base station 1505 in accordance with the transmission parameters received from the base station 1505. At the base station 1505, the UL signals from the UE 1515 may be received by the base station antennas 1534, processed by the base station modulators 1532, detected by a base station MIMO detector 1536 if applicable, and further processed by a base station receive processor. The base station receive processor 1538 may provide decoded data to a base station data output and to the base station processor 1540. The components of the UE 1515 may, individually or collectively, be implemented with one or more Application Specific Integrated Circuits (ASICs) adapted to perform some or all of the applicable functions in hardware. Each of the noted modules may be a means for performing one or more functions related to operation of the communication system 1500. Similarly, the components of the base station 1505 may, individually or collectively, be implemented with one or more Application Specific Integrated Circuits (ASICs) adapted to perform some or all of the applicable functions in hardware. Each of the noted components may be a means for performing one or more functions related to operation of the communication system 1500.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one example, the base station 1505 and/or the UE 1515 includes means for performing one or more CCA procedures to contend for one or more transmission periods within a radio frequency spectrum band shared by a plurality of asynchronous operators, means for winning the contention for the one or more transmission periods within the radio frequency spectrum band, means for determining whether the one or more transmission periods for which contention has been won is equal to or greater than a threshold number of consecutive transmission periods, and means for relinquishing occupancy of the radio frequency spectrum band for a period of time, based on the determination that the one or more transmission periods for which contention has been won is equal to or greater than a threshold number of consecutive transmission periods. In one aspect, the aforementioned means may be the base station processor 1540, the base station memory 1542, the base station transmit processor 1520, base station receiver processor 1538, the base station modulators 1532, and the base station antennas 1534 of the base station 1505 configured to perform the functions recited by the aforementioned means. In another aspect, the aforementioned means may be the UE processor 1580, the UE memory 1582, the UE transmit processor 1564, UE receiver processor 1558, the UE demodulators 1554, and the UE antennas 1552 of the UE 1515 configured to perform the functions recited by the aforementioned means.

Figure 16:
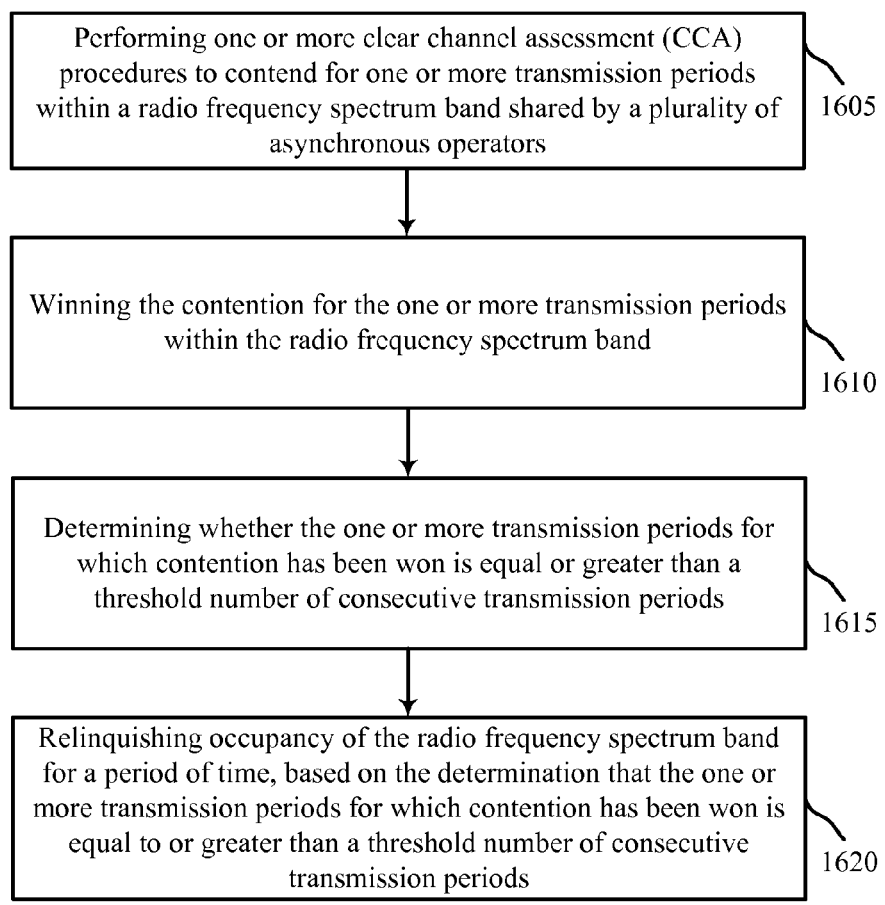
FIG. 16 is a flowchart conceptually illustrating an example of a method of wireless communication, in accordance with aspects of the present disclosure.

FIG. 16 is a flowchart 1600 conceptually illustrating an example of a method of wireless communication, in accordance with aspects of the present disclosure. For clarity, the method 1600 is described below with reference to ones of the UEs, eNBs, base stations, or devices 105, 115, 205, 215, 305, 315, 1205, 1255, 1305, 1415, 1505 and/or 1515 described with reference to FIG. 1, 2, 3, 12A, 12B, 13, 14, and/or 15. In one example, a UE, base station, or device may execute one or more sets of codes to control the functional elements of the UE, base station, or device to perform the functions described below.

At block 1605, one or more CCA procedures are performed to contend for one or more transmission periods within a radio frequency spectrum band shared by a plurality of asynchronous operators. The operation(s) at block 1605 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, the UE unlicensed radio frequency spectrum band module 1440 in conjunction with the other components described with reference to FIG. 14, and/or the processors 1540 or 1580 in conjunction with the components described with reference to FIG. 15.

At block 1610, it is determined that the contention is won for the one or more transmission periods within the radio frequency spectrum band. The operation(s) at block 1610 may in some cases be performed using the channel contention module 1220 and/or 1260 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

At block 1615, it is determined whether the one or more transmission periods for which contention has been won is equal or greater than a threshold number of consecutive transmission periods. The operation(s) at block 1615 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

At block 1620, occupancy of the radio frequency spectrum band is relinquished (e.g., by stopping contention procedures and/or transmissions/receptions on the radio frequency spectrum band) for a period of time, based on the determination that the one or more transmission periods for which contention has been won is equal to or greater than a threshold number of consecutive transmission periods. The operation(s) at block 1620 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

Thus, the method 1600 may provide for wireless communications in which a contention—based channel access procedure may be modified to accommodate the presence of one or more asynchronous operators in order to provide fairness in access to a radio frequency spectrum band channel according to a contention-based access protocol. It should be noted that the method 1600 is just one implementation and that the operations of the method 1600 may be rearranged or otherwise modified such that other implementations are possible.

Figure 17:
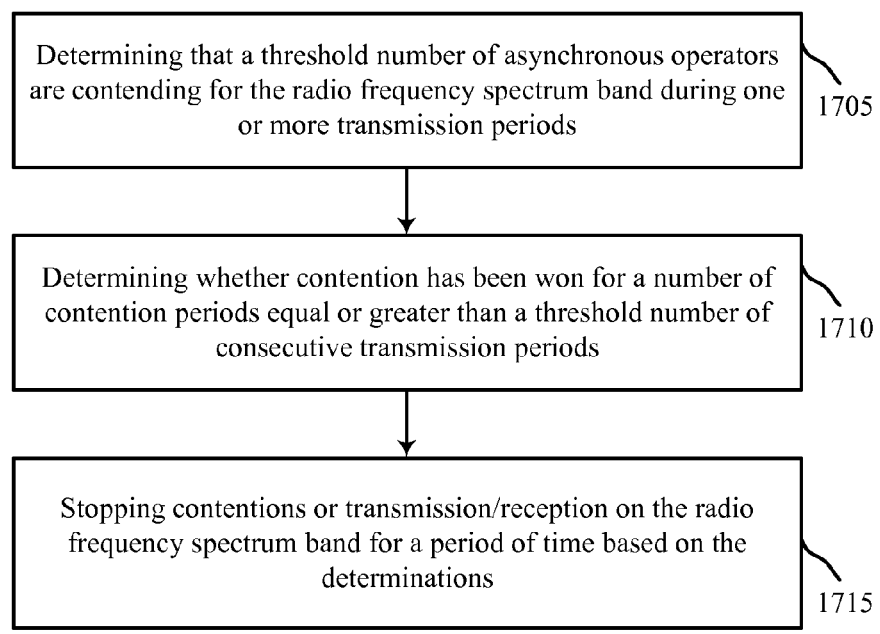
FIG. 17 is a flowchart conceptually illustrating an example of a method of wireless communication, in accordance with aspects of the present disclosure.

FIG. 17 is a flowchart 1700 conceptually illustrating an example of a method of wireless communication, in accordance with aspects of the present disclosure. For clarity, the method 1700 is described below with reference to ones of the UEs, eNBs, base stations, or devices 105, 115, 205, 215, 305, 315, 1205, 1255, 1305, 1415, 1505 and/or 1515 described with reference to FIG. 1, 2, 3, 12A, 12B, 13, 14, and/or 15. In one example, a UE, base station, or device may execute one or more sets of codes to control the functional elements of the UE, base station, or device to perform the functions described below.

At block 1705, it is determined that a threshold number of asynchronous operators are contending for the radio frequency spectrum band during one or more transmission periods. In some examples, such a determination may be made through monitoring of transmissions of one or more asynchronous operators, and/or through the receipt of signaling with information related to the one or more asynchronous operators. In some examples, the threshold number of asynchronous operators is one. The operation(s) at block 1705 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, the UE unlicensed radio frequency spectrum band module 1440 in conjunction with the other components described with reference to FIG. 14, and/or the processors 1540 or 1580 in conjunction with the components described with reference to FIG. 15.

At block 1710, it is determined whether contention has been won for a number of transmission periods equal to or greater than a threshold number of consecutive transmission periods. The threshold number of transmission periods may be determined, for example, based on a number of other asynchronous operators, an amount of buffered data at one or more other asynchronous operators, and/or based on signaled or preset thresholds. The operation(s) at block 1710 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

At block 1715, transmissions may be stopped for a period of time, responsive to the determination of the threshold number of operators and the number of consecutive transmission periods for which contention has been won. The operation(s) at block 1710 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

Thus, the method 1700 may provide for wireless communications in which a contention—based channel access procedure may be modified to accommodate the presence of one or more asynchronous operators in order to provide fairness in access to a radio frequency spectrum band channel according to a contention-based access protocol. It should be noted that the method 1700 is just one implementation and that the operations of the method 1700 may be rearranged or otherwise modified such that other implementations are possible.

Figure 18:
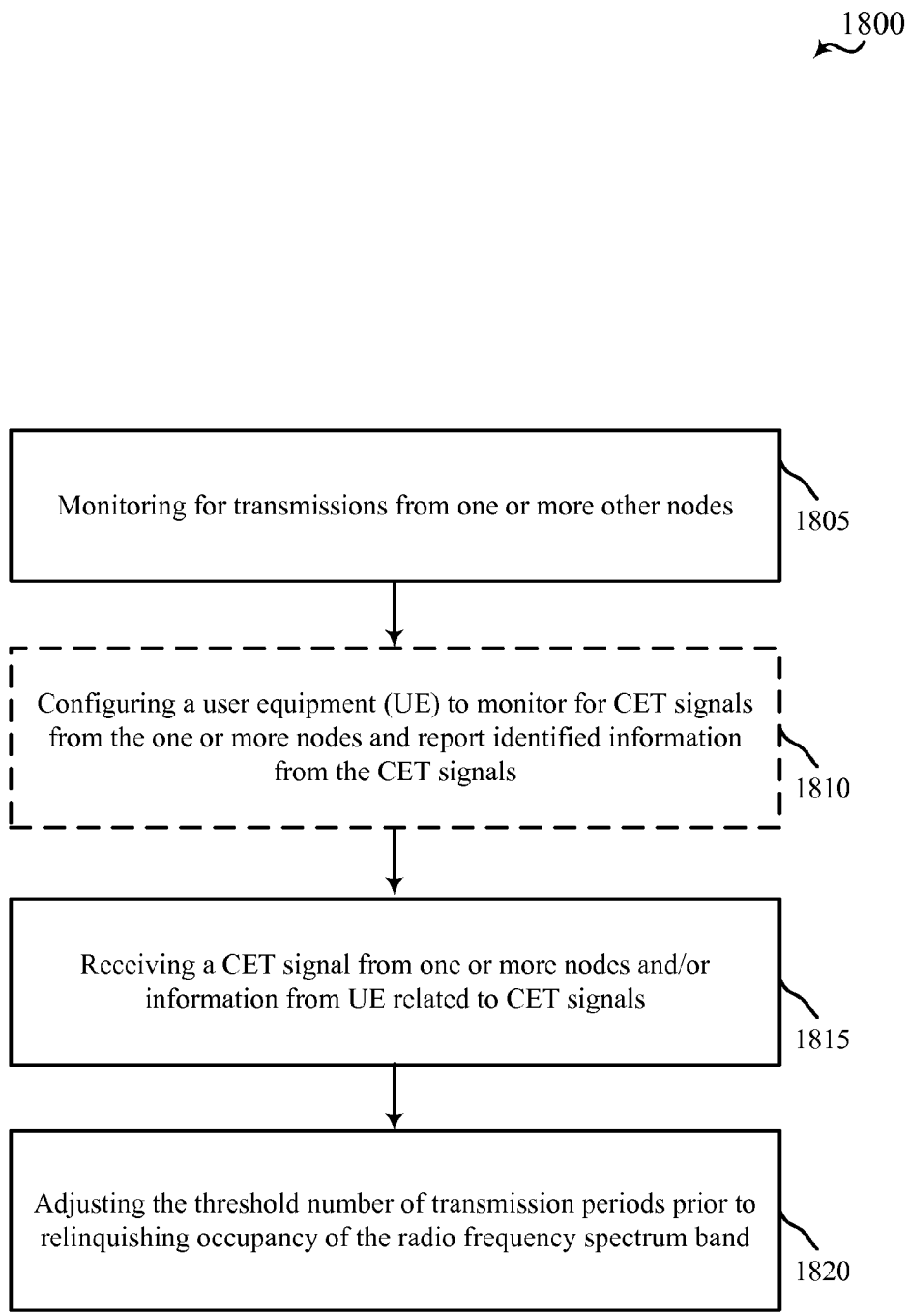
FIG. 18 is a flowchart conceptually illustrating an example of a method of wireless communication, in accordance with aspects of the present disclosure.

FIG. 18 is a flowchart 1800 conceptually illustrating an example of a method of wireless communication, in accordance with aspects of the present disclosure. For clarity, the method 1800 is described below with reference to ones of the eNBs, base stations, or devices 105, 205, 305, 1205, 1255, 1305, and/or 1505 described with reference to FIG. 1, 2, 3, 12A, 12B, 13, and/or 15. In one example, a base station, or device may execute one or more sets of codes to control the functional elements of the base station, or device to perform the functions described below.

At block 1805, transmissions from one or more other nodes are monitored. The operation(s) at block 1805 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, and/or the base station processor 1540 in conjunction with the components described with reference to FIG. 15.

At optional block 1810, a user equipment may be configured to monitor for CET signals or other signals transmitted from the one or more nodes and report identified information from the CET signals. The operation(s) at block 1810 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, and/or the processor 1540 in conjunction with the components described with reference to FIG. 15.

At block 1815, a CET signal is received from one or more nodes and/or information is received from one or more UEs related to CET signals. As discussed above, a CET signal may provide an indication of the presence of one or more asynchronous nodes, and may also provide information related to the node and buffered data that is to be transmitted from the node, according to some examples. The operation(s) at block 1815 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, and/or the processor 1540 in conjunction with the components described with reference to FIG. 15.

At block 1820, an adjustment is made to the threshold number of consecutive transmission periods based at least in part on the signals received from the one or more nodes prior to relinquish occupancy of the radio frequency spectrum band and/or based at least in part on the information received from one or more UEs related to CET signals. The operation(s) at block 1820 may in some cases be performed using the channel contention module 1220 and/or 1255 described with reference to FIG. 12A and/or 12B, the base station unlicensed radio frequency spectrum band module 1370 described with reference to FIG. 13, and/or the processor 1540 in conjunction with the components described with reference to FIG. 15.

Thus, the method 1800 may provide for wireless communications in which a contention—based channel access procedure may be modified to accommodate the presence of one or more asynchronous operators in order to provide fairness in access to a radio frequency spectrum band channel according to a contention-based access protocol. It should be noted that the method 1800 is just one implementation and that the operations of the method 1800 may be rearranged or otherwise modified such that other implementations are possible.

Figure 19:
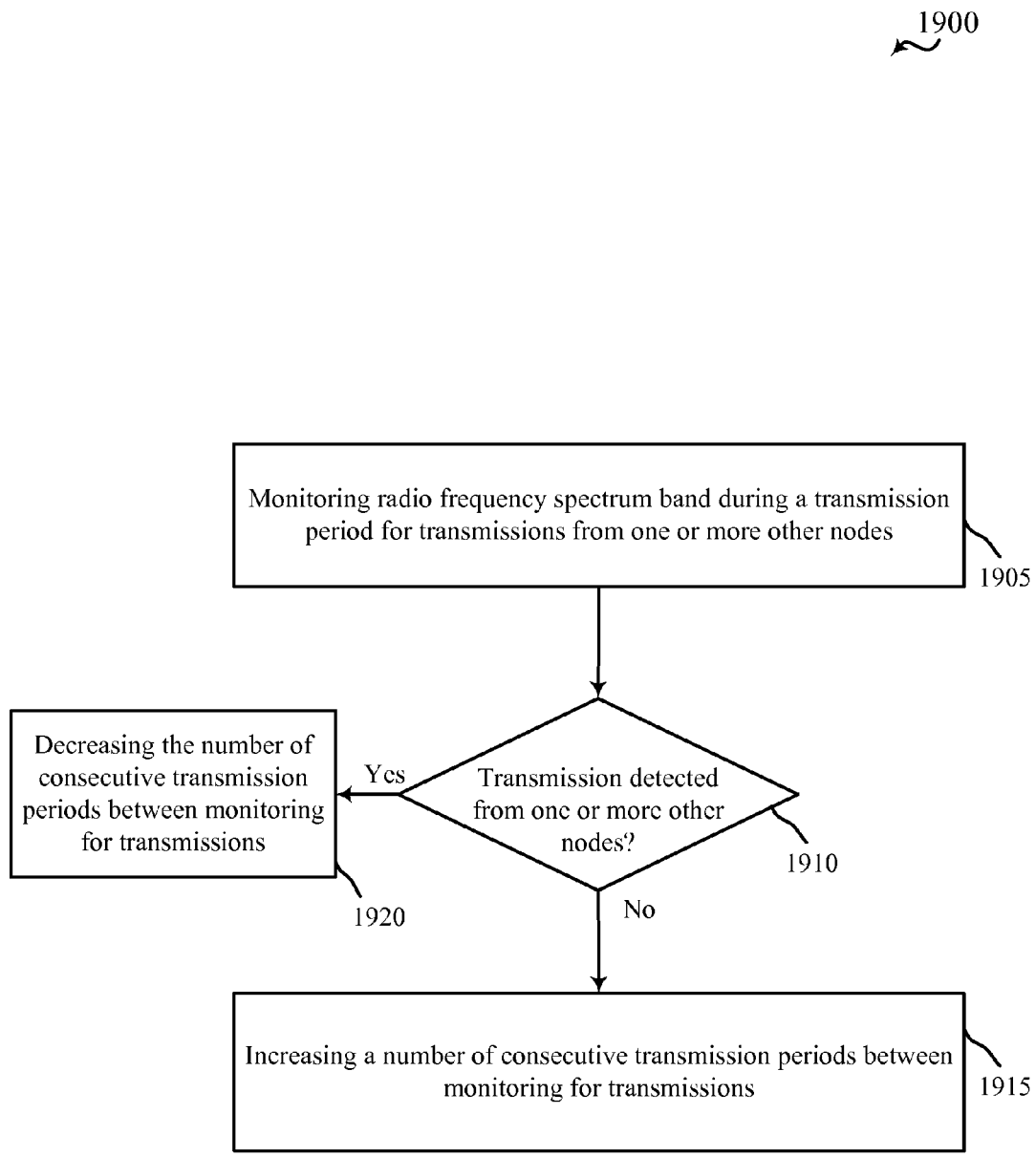
FIG. 19 is a flowchart conceptually illustrating an example of a method of wireless communication, in accordance with aspects of the present disclosure.

FIG. 19 is a flowchart 1900 conceptually illustrating an example of a method of wireless communication, in accordance with aspects of the present disclosure. For clarity, the method 1900 is described below with reference to ones of the UEs, eNBs, base stations, or devices 105, 115, 205, 215, 305, 315, 1205, 1255, 1305, 1415, 1505 and/or 1515 described with reference to FIG. 1, 2, 3, 12A, 12B, 13, 14, and/or 15. In one example, a UE, base station, or device may execute one or more sets of codes to control the functional elements of the UE, base station, or device to perform the functions described below.

At block 1905, the radio frequency spectrum band is monitored for transmissions from one or more other nodes. The operation(s) at block 1905 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, the UE unlicensed radio frequency spectrum band module 1440 in conjunction with the other components described with reference to FIG. 14, and/or the processors 1540 or 1580 in conjunction with the components described with reference to FIG. 15.

At block 1910, it is determined whether a transmission is detected from one or more other nodes. According to some examples, transmissions may be monitored for one or more asynchronous nodes. For example if a transmission is detected from a WiFi operator, such a transmission may not be considered to be detected transmission for the determination of block 1910, because WiFi nodes may not operate in a coordinated manner and adjusting monitoring intervals for such devices therefore may not materially enhance the ability of such a WiFi node to access the radio frequency spectrum band. The operation(s) at block 1910 may in some cases be performed using the channel contention module 1220 and/or 1260 in conjunction with the other components described with reference to FIG. 12A and/or 12B, base station unlicensed radio frequency spectrum band module 1370 in conjunction with the other components described with reference to FIG. 13, the UE unlicensed radio frequency spectrum band module 1440 in conjunction with the other components described with reference to FIG. 14, and/or the processors 1540 or 1580 in conjunction with the components described with reference to FIG. 15.

If it is determined that no transmissions are detected at block 1910, a number of consecutive transmission periods between monitoring for transmissions is increased, as indicated at block 1915. The absence of such transmissions may indicate that there are not any asynchronous operators present that are attempting to access the radio frequency spectrum band, and therefore the number of consecutive transmissions may be increased to further enhance the use of the radio frequency spectrum band. The operation(s) at block 1910 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

If it is determined that no transmissions are detected at block 1910, the number of consecutive transmission periods between monitoring for transmissions is decreased, as indicated at block 1920. The presence of transmissions may indicate that there are other asynchronous operators present that are attempting to access the radio frequency spectrum band, and therefore the number of consecutive transmissions may be decreased to further enhance fairness among operators for the use of the radio frequency spectrum band. The operation(s) at block 1920 may in some cases be performed using the channel contention module 1220 and/or 1255 described with reference to FIG. 12A and/or 12B, the base station unlicensed radio frequency spectrum band module 1370 described with reference to FIG. 13, the UE unlicensed radio frequency spectrum band module 1440 described with reference to FIG. 14, and/or the processors 1540 or 1580 in conjunction with the components described with reference to FIG. 15.

Thus, the method 1900 may provide for wireless communications in which a contention—based channel access procedure may be modified to accommodate the presence of one or more asynchronous operators in order to provide fairness in access to a radio frequency spectrum band channel according to a contention-based access protocol. It should be noted that the method 1900 is just one implementation and that the operations of the method 1900 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
    performing one or more clear channel assessment (CCA) procedures to contend for one or more transmission periods within a first radio frequency spectrum band shared by a plurality of asynchronous operators;
    winning the contention for the one or more transmission periods within the first radio frequency spectrum band;
    determining whether the one or more transmission periods for which contention has been won is equal to or greater than a threshold number of consecutive transmission periods; and
    relinquishing occupancy of the first radio frequency spectrum band for a period of time, based on a determination that the one or more transmission periods for which contention has been won is equal to or greater than a threshold number of consecutive transmission periods.

2. The method of claim 1, wherein relinquishing occupancy of the first radio frequency spectrum band comprises at least one of stopping CCA procedures, stopping transmission, or stopping reception, for the period of time.

3. The method of claim 1, further comprising:
    determining whether a threshold number of asynchronous operators are contending for the first radio frequency spectrum band during the one or more transmission periods, and
    wherein the period of time of relinquishing occupancy of the first radio frequency spectrum band is based at least in part on the determination that the threshold number of asynchronous operators are contending for the first radio frequency spectrum band.

4. The method of claim 3, further comprising:
    discontinuing the period of time of relinquishment of occupancy of the first radio frequency spectrum band based at least in part on the determination that less than the threshold number of asynchronous operators are contending for the first radio frequency spectrum band during the one or more transmission periods.

5. The method of claim 3, wherein determining whether the threshold number of asynchronous operators are contending for the first radio frequency spectrum band comprises:
    monitoring for transmissions from one or more other asynchronous operators.

6. The method of claim 5, wherein the monitoring comprises:
monitoring for one or more CCA exempt transmission (CET) signals from the one or more other asynchronous operators during the period of time of the relinquishment of occupancy of the first radio frequency spectrum band.

7. The method of claim 6, wherein the monitoring further comprises:
receiving the one or more CET signals from the one or more other asynchronous operators; and
adjusting the threshold number of consecutive transmission periods prior to relinquishing occupancy of the first radio frequency spectrum band.

8. The method of claim 6, wherein the monitoring further comprises:
configuring a user equipment to monitor for the one or more CET signals from the one or more other asynchronous operators and report identified information from the one or more CET signals.

9. The method of claim 3, wherein determining whether a threshold number of asynchronous operators are contending for the first radio frequency spectrum band comprises:
receiving information identifying one or more asynchronous operators via one or more of a user equipment or an X2 communications link.

10. The method of claim 1, wherein the threshold number of consecutive transmission periods is determined based on one or more of:
a number of asynchronous operators performing CCA procedures to contend for the first radio frequency spectrum band during the one or more transmission periods; or
an amount of data backlog at one of the plurality of asynchronous operators.

11. The method of claim 10, further comprising:
monitoring the first radio frequency spectrum band during the period of time of relinquishment of occupancy of the first radio frequency spectrum band for transmissions from the one of the plurality of asynchronous operators;
increasing the threshold number of consecutive transmission periods in an absence of the transmissions from the one of the plurality of asynchronous operators; and
decreasing the threshold number of consecutive transmission periods when the transmissions from the one of the plurality of asynchronous operators are detected.

12. The method of claim 1, wherein a CCA procedure of the one or more CCA procedure is performed in a first contention period among a set of coordinated nodes, and
wherein determining that contention has been won for the threshold number of consecutive transmission periods comprises determining that contention has been won by one or more nodes of the set of coordinated nodes for the threshold number of consecutive transmission periods.

13. The method of claim 1, further comprising:
occupying a second radio frequency spectrum band during the period of time of the relinquishment of occupancy of the first radio frequency spectrum band.

14. An apparatus for wireless communication, comprising:
means for performing one or more clear channel assessment (CCA) procedures to contend for one or more transmission periods within a radio frequency spectrum band shared by a plurality of asynchronous operators;
means for identifying that contention is won for the one or more transmission periods within the radio frequency spectrum band;
means for determining whether the one or more transmission periods for which contention has been won is equal to or greater than a threshold number of consecutive transmission periods; and
means for relinquishing occupancy of the radio frequency spectrum band for a period of time, based on a determination that the one or more transmission periods for which contention has been won is equal to or greater than a threshold number of consecutive transmission periods.

15. The apparatus of claim 14, further comprising:
means for determining whether a threshold number of asynchronous operators are contending for the radio frequency spectrum band during one or more of the transmission periods, and
wherein the period of time of relinquishing occupancy of the radio frequency spectrum band is based at least in part on the determination that a threshold number of asynchronous operators are contending for the radio frequency spectrum band.

16. The apparatus of claim 15, further comprising:
means for discontinuing the period of time of relinquishment of occupancy of the radio frequency spectrum band based at least in part on the determination that less than the threshold number of asynchronous operators are contending for the radio frequency spectrum band during one or more transmission periods.

17. The apparatus of claim 14, wherein the threshold number of consecutive transmission periods is determined based on one or more of:
a number of asynchronous operators performing CCA procedures to contend for the radio frequency spectrum band during transmission periods; or
an amount of data backlog at one of the plurality of asynchronous operators.

18. The apparatus of claim 17, further comprising:
means for monitoring the radio frequency spectrum band during the period of time of relinquishment of occupancy of the radio frequency spectrum band for transmissions from the one of the plurality of asynchronous operators;
means for increasing the threshold number of consecutive transmission periods in an absence of the transmissions from the one of the plurality of asynchronous operators; and
means for decreasing the threshold number of consecutive transmission periods when the transmissions from one of the plurality of asynchronous operators are detected.

19. An apparatus for wireless communications, comprising:
a processor;
memory in electronic communication with the processor; and
instructions stored in the memory, the instructions being executable by the processor to cause the apparatus to:
perform one or more clear channel assessment (CCA) procedures to contend for one or more transmission periods within a first radio frequency spectrum band shared by a plurality of asynchronous operators;
identify that contention is won for the one or more transmission periods within the first radio frequency spectrum band;
determine whether the one or more transmission periods for which contention has been won is equal to or greater than a threshold number of consecutive transmission periods; and relinquish occupancy of the first radio frequency spectrum band for a period of time, based on a determination that the one or more transmission periods for which contention has been won is equal to or greater than a threshold number of consecutive transmission periods.

20. The apparatus of claim 19, wherein the instructions are further executable by the processor to cause the processor to determine whether a threshold number of asynchronous operators are contending for the first radio frequency spectrum band during one or more of the transmission periods, and wherein the period of time of relinquishing occupancy of the first radio frequency spectrum band is based at least in part on the determination that a threshold number of asynchronous operators are contending for the first radio frequency spectrum band.

21. The apparatus of claim 20, wherein the instructions are further executable by the processor to cause the processor to discontinue the relinquishment of occupancy of the first radio frequency spectrum band based at least in part on the determination that less than the threshold number of asynchronous operators are contending for the first radio frequency spectrum band during one or more transmission periods.

22. The apparatus of claim 20, wherein the instructions are further executable by the processor to cause the processor to monitor for one or more CCA exempt transmission (CET) signals from other asynchronous operators during the period of time of the relinquishment of occupancy of the first radio frequency spectrum band.

23. The apparatus of claim 22, wherein the instructions are further executable by the processor to cause the processor to receive the one or more CET signals from one or more asynchronous operators and adjust the threshold number of consecutive transmission periods prior to relinquishing occupancy of the first radio frequency spectrum band.

24. The apparatus of claim 22, wherein the instructions are further executable by the processor to cause the processor to configure a user equipment to monitor for the one or more CET signals from one or more asynchronous operators and report identified information from the one or more CET signals.

25. The apparatus of claim 19, wherein the threshold number of consecutive transmission periods is determined based on one or more of:
  a number of asynchronous operators performing CCA procedures to contend for the first radio frequency spectrum band during transmission periods; or
  an amount of data backlog at one of the plurality of asynchronous operators.

26. The apparatus of claim 25, wherein the instructions are further executable by the processor to cause the processor to monitor the first radio frequency spectrum band during the period of time of relinquishment of occupancy of the first radio frequency spectrum band for transmissions from one of the plurality of asynchronous operators, increase the threshold number of consecutive transmission periods in an absence of the transmissions from one of the plurality of asynchronous operators, and decrease the threshold number of consecutive transmission periods when the transmissions from one of the plurality of asynchronous operators are detected.

27. The apparatus of claim 19, wherein the instructions are further executable by the processor to cause the processor to occupy a second radio frequency spectrum band during the period of time of the relinquishment of occupancy of the first radio frequency spectrum band.

28. A computer program product for wireless communications, the computer program product comprising a non-transitory computer-readable medium storing instructions executable by a processor to cause a wireless communications apparatus to:
  perform one or more clear channel assessment (CCA) procedures to contend for one or more transmission periods within a radio frequency spectrum band shared by a plurality of asynchronous operators;
  identify that contention is won for the one or more transmission periods within the radio frequency spectrum band;
  determine whether the one or more transmission periods for which contention has been won is equal to or greater than a threshold number of consecutive transmission periods; and
  relinquish occupancy of the radio frequency spectrum band for a period of time, based on a determination that the one or more transmission periods for which contention has been won is equal to or greater than a threshold number of consecutive transmission periods.

29. The computer program product of claim 28, wherein the instructions are further executable by the processor to cause the wireless communication apparatus to determine whether a threshold number of asynchronous operators are contending for the radio frequency spectrum band during one or more of the transmission periods, and wherein the period of time of relinquishing occupancy of the radio frequency spectrum band is based at least in part on the determination that a threshold number of asynchronous operators are contending for the radio frequency spectrum band.

30. The computer program product of claim 28, wherein the threshold number of consecutive transmission periods is determined based on one or more of:
  a number of asynchronous operators performing CCA procedures to contend for the radio frequency spectrum band during transmission periods; or
  an amount of data backlog at one of the plurality of asynchronous operators.

* * * * *